United States Patent [19]

Satterwhite

[11] 4,234,073
[45] * Nov. 18, 1980

[54] AERIAL CONVEYOR SYSTEM

[76] Inventor: Charles R. Satterwhite, 5539 Harvest Hill, #1121, Dallas, Tex. 75230

[*] Notice: The portion of the term of this patent subsequent to Jul. 18, 1995, has been disclaimed.

[21] Appl. No.: 923,394

[22] Filed: Jul. 10, 1978

Related U.S. Application Data

[63] Continuation-in-part of Ser. No. 620,929, Oct. 9, 1975, Pat. No. 4,101,019, which is a continuation of Ser. No. 413,537, Nov. 7, 1973, abandoned.

[51] Int. Cl.³ .............................................. B65G 41/00
[52] U.S. Cl. ..................... 198/304; 198/311; 198/862
[58] Field of Search ............... 198/300, 301, 304, 311, 198/827–830, 860, 861, 863, 862, 823, 824; 299/18, 64–68; 14/22, 23, 70; 52/83; 198/588, 594, 314, 813, 815

[56] References Cited

U.S. PATENT DOCUMENTS

| | | | |
|---|---|---|---|
| 2,393,563 | 1/1946 | Petterson | 198/815 |
| 4,101,019 | 7/1978 | Satterwhite | 198/304 |

FOREIGN PATENT DOCUMENTS

| | | | |
|---|---|---|---|
| 449847 | 9/1927 | Fed. Rep. of Germany | 198/863 |
| 644444 | 5/1937 | Fed. Rep. of Germany | 198/594 |
| 916583 | 8/1954 | Fed. Rep. of Germany | 52/83 |
| 180550 | 5/1966 | U.S.S.R. | 198/300 |

Primary Examiner—Joseph E. Valenza
Attorney, Agent, or Firm—Richards, Harris & Medlock

[57] ABSTRACT

An aerial conveyor system comprises a pair of spaced apart cables extending from a first vehicle including material delivery apparatus across a material receiving zone, across an open area, and across a material discharge zone to a second vehicle. The cables support a conveyor support frame comprising a pair of elongate members extending substantially parallel to the cables, a plurality of transversely disposed conveyor support rollers, and structure for suspending the elongate members from the cables. An endless conveyor belt is mounted for movement around a course defined by the conveyor support rollers of the conveyor support frame and functions to transport material received from the delivery apparatus of the first vehicle in the receiving zone across the open area to the discharge zone. An axially outwardly directed force is applied to the ends of the conveyor system to suspend the system from the receiving zone to the discharge zone. Structure is provided for varying the tension on the conveyor belt in relation to the loading on the belt. In the use of the aerial conveyor system, overburden is preferably removed in accordance with a series of vertically stacked zones. The aerial conveyor system is then employed to discharge the excavated material into a previously mined portion of the excavation in accordance with the same vertical sequence. By this means the original vertical configuration of the excavation is restored, thereby facilitating return of the mined area to productive usage.

19 Claims, 35 Drawing Figures

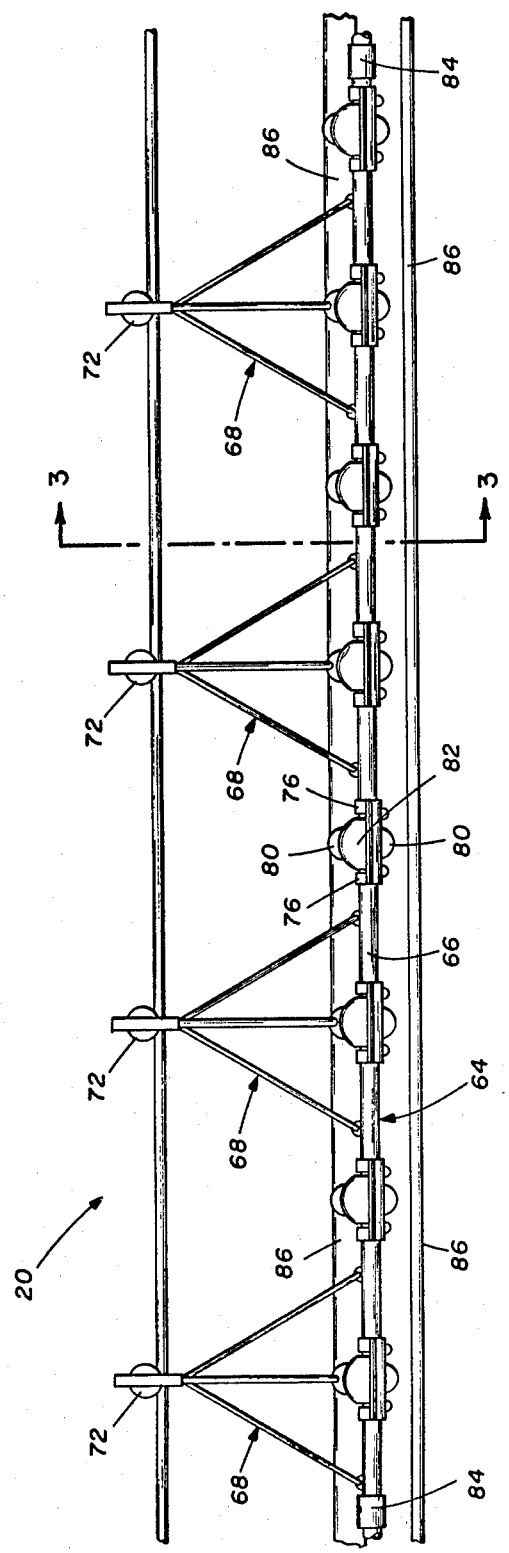
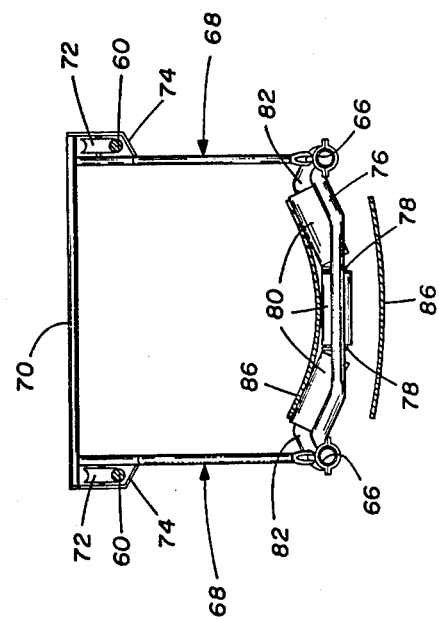
FIG. 2
FIG. 3

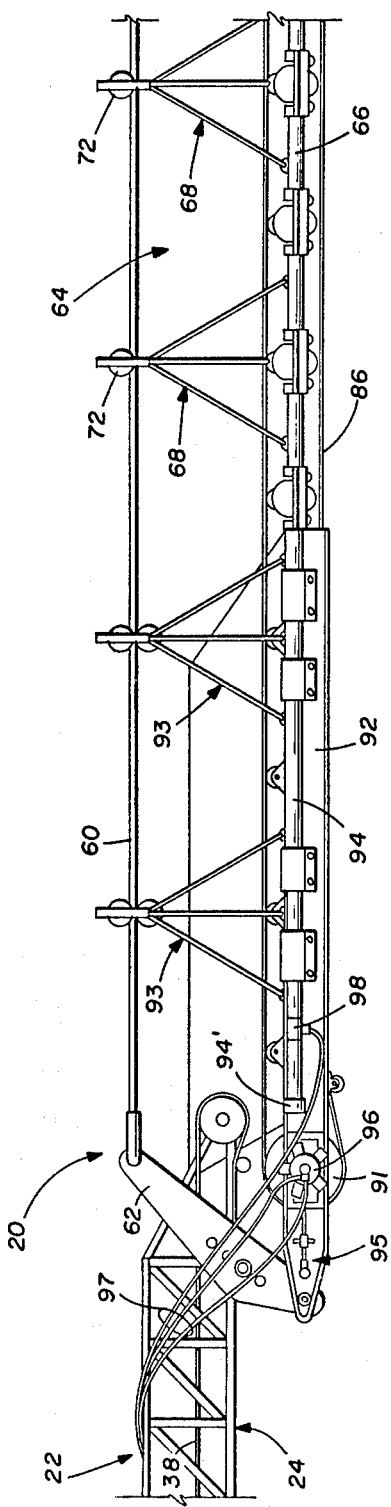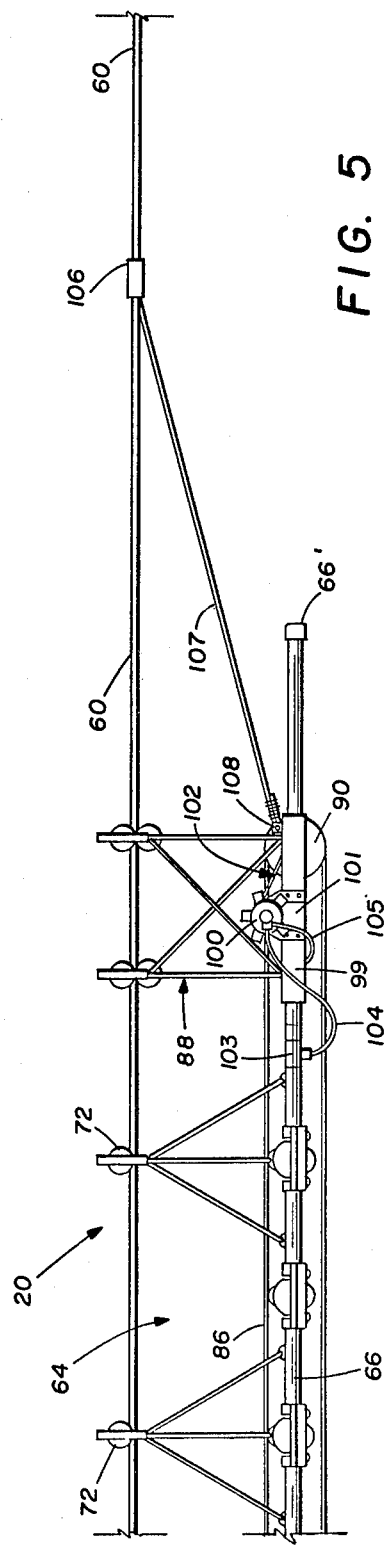

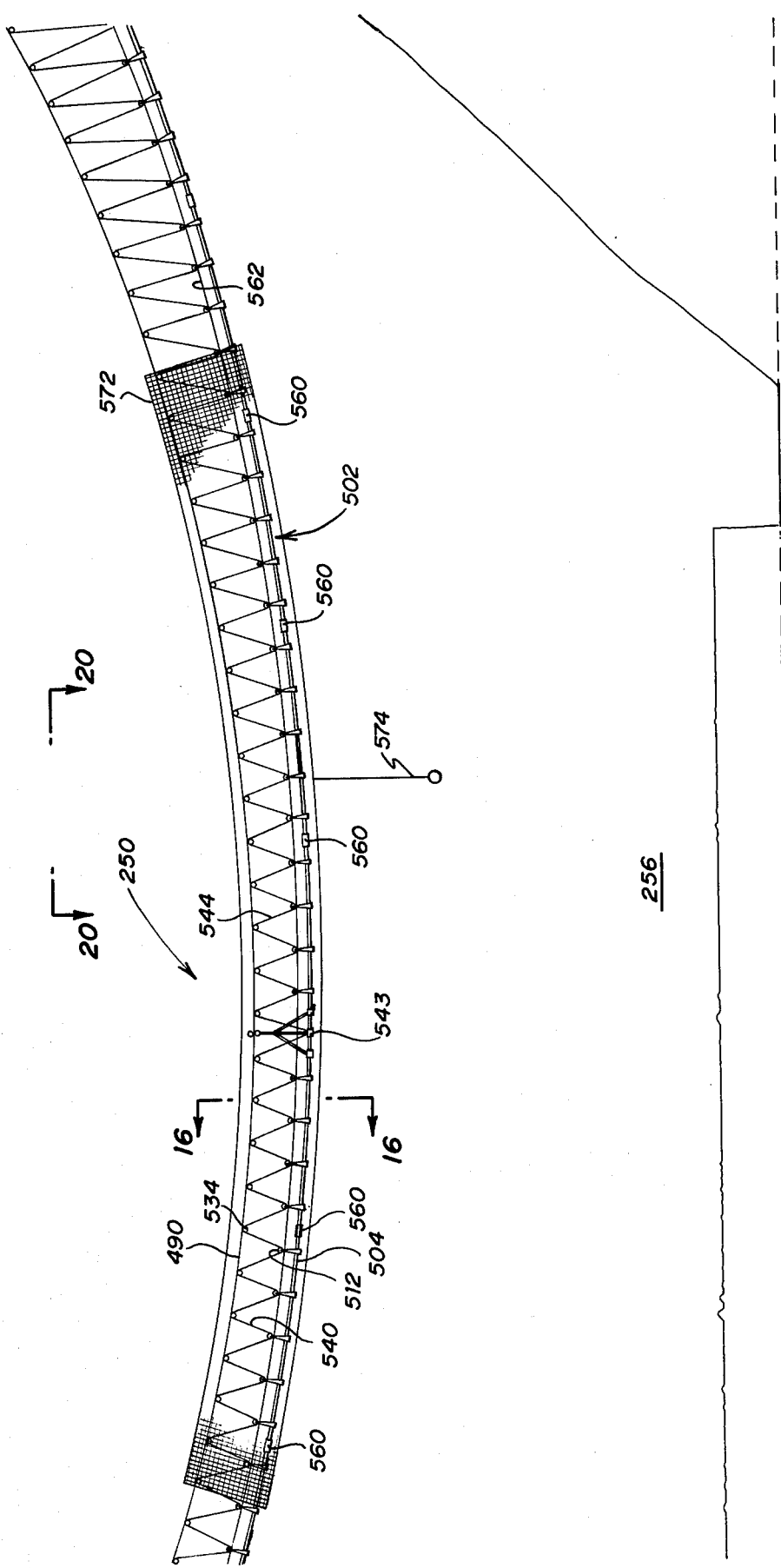

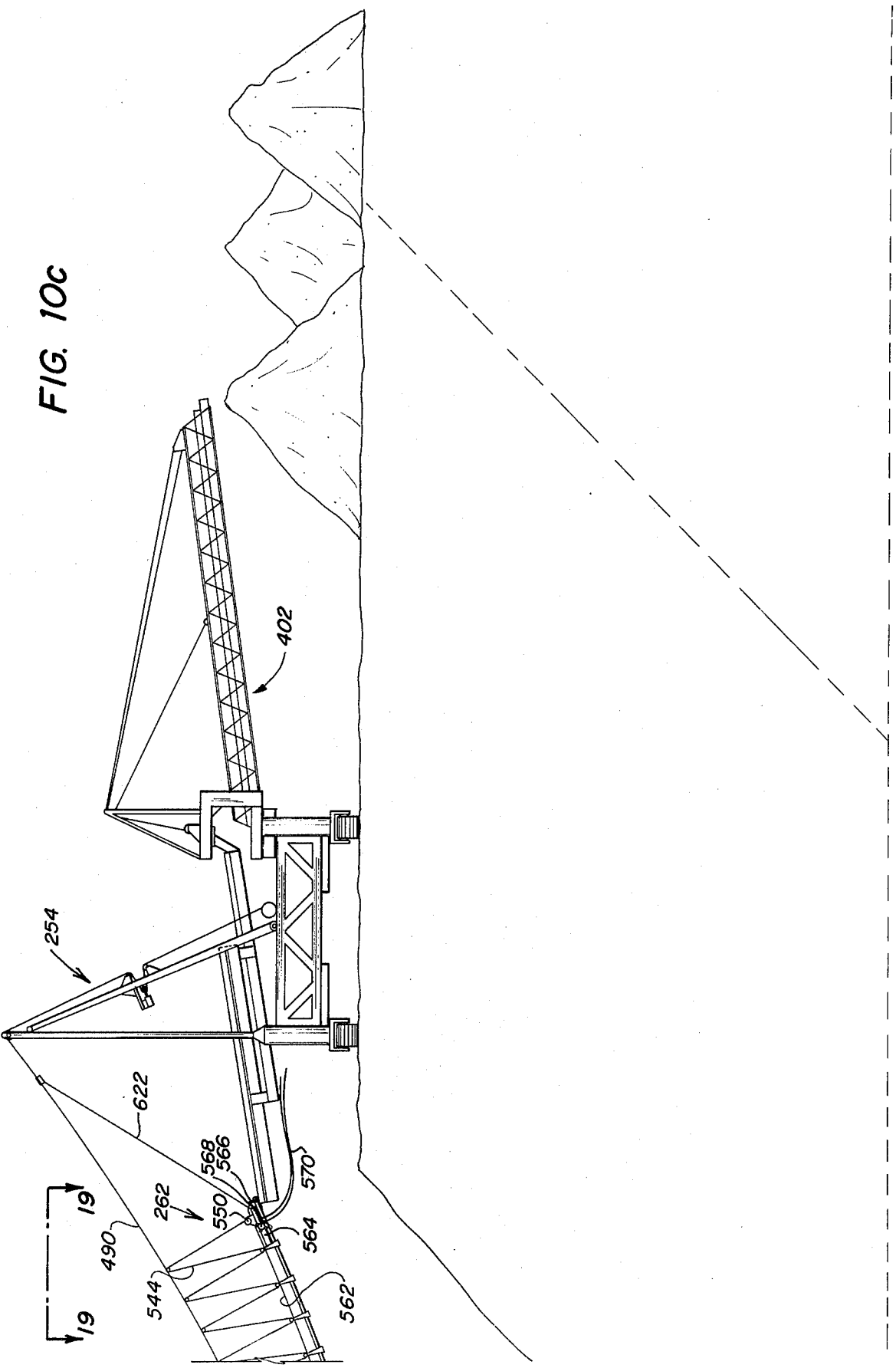

AERIAL CONVEYOR SYSTEM

CROSS REFERENCE TO RELATED APPLICATIONS

This application is a continuation-in-part of Ser. No. 620,929, filed Oct. 9, 1975, now U.S. Pat. No. 4,101,019 entitled AERIAL CONVEYOR SYSTEM, which was a continuation of Ser. No. 413,537, filed Nov. 7, 1973, abandoned.

BACKGROUND AND SUMMARY OF THE INVENTION

This invention relates to an aerial conveyor system and particularly to an aerial conveyor system that is especially useful in conjunction with strip mining operations.

Strip mining is carried out by removing a layer of material, commonly referred to as "overburden", in order to expose an ore-bearing layer. The ore-bearing layer is then removed using one or more of several conventional techniques depending upon the particular mining operation. Following the mining operation, the excavation may either be refilled or allowed to fill with water.

Although generally more economical than subsurface mining operations, the strip mining procedures in use at the present time typically involve a number of highly disadvantageous characteristics. First, it will be appreciated that in those instances in which the ore-bearing layer to be mined extends over a substantial distance, it is at least theoretically possible to utilize overburden removed from a particular area to refill a previously mined area of the excavation. This possibility has heretofore not been fully utilized in view of the fact that the equipment available to carry out the operation has been less than wholly satisfactory.

For example, systems for refilling strip mining excavations have been constructed using conveyors. However, the conveyors presently available for use in these systems comprise apparatus extending first down one side of the excavation, then along the bottom, and then up the other side. Such equipment is unsatisfactory both because it is unduly expensive and because it is unduly cumbersome to reposition as the excavation of the mine continues.

It is also possible to utilize dump trucks or similar vehicles to convey the newly excavated overburden material to the refilling location. However, this too has proved both unduly costly and cumbersome due to traffic problems which are encountered when a large number of dump trucks are employed in a mining location.

An even more important considereation in the refilling of a strip mining excavation is based on ecological factors. Regardless of whether conveyors or dump trucks are utilized to transport the excavated overburden material to the refilling location, it is presently necessary to refill the previously mined portion of the excavation in substantially reverse order from that in which the overburden material is removed. This means that the topsoil layer is deposited on the bottom of the excavation, followed by the next adjacent subsoil layer, etc. In many instances the net result of this procedure is that the material comprising the surface of the refilled area is not of a type which is capable of sustaining trees and grass, crops, or other vegetation. There is thus produced a substantial desert which is of no practical value.

The present invention comprises an aerial conveyor system which is useful in strip mining operations to eliminate the foregoing and other problems long associated with the prior art. In accordance with the broader aspects of the invention, an aerial conveyor is suspended between two vehicles located on the opposite sides of a strip mining excavation. The first vehicle is positioned adjacent the side at which overburden is being removed from the excavation, and includes apparatus for delivering excavated material to the conveyor. The second vehicle is utilized to position the discharge end of the conveyor over a previously mined portion of the excavation.

The use of the invention is advantageous from a number of standpoints. First, by means of the invention there is provided a system for transporting excavated overburden to a refilling location which does not involve the expense and repositioning difficulties of prior conveyor systems and which simultaneously eliminates the expense and traffic problems encountered when dump trucks are utilized to perform this function. Second, by means of the invention the overall costs of a strip mining operation is substantially reduced. Finally, by means of the invention it is possible to refill the excavation in exactly the same order in which the overburden was removed therefrom. That is, the refilled portion of the excavation is characterized by having topsoil at the upper surface thereof, whereby the process of returning the mined area to productive usage is greatly facilitated.

In accordance with the broader structural aspects of the invention, the aerial conveyor system comprises at least one cable suspended between the two vehicles. A substantially rigid conveyor support structure is supported by the cable and extends from a receiving zone adjacent the first vehicle across an open area of the excavation to a discharge zone. A plurality of spaced apart, substantially transversely disposed conveyor support rollers are mounted on the support structure, and an endless conveyor belt is mounted for movement around a course defined by the conveyor support rollers. The conveyor belt functions to transport material received in the receiving zone from the delivery means of the first vehicle across the open area of the excavation and to discharge the material in the discharge zone.

In accordance with more specific aspects of the invention, the conveyor support structure comprises a plurality of conveyor support frames each including a plurality of hook rollers engaging one of the cables and a pair of elongate members supported by the hook rollers and extending substantially parallel to the cables. The conveyor support frames are mounted end to end, and the elongate members of the conveyor support frames are interconnected to define an array of conveyor support frames which is substantially rigid and which extends from the receiving zone across the open area to the discharge zone. The conveyor support frame at the discharge zone end of the array supports a drive roller and a drive motor which actuates the drive roller to move the conveyor belt around the course. In accordance with one embodiment of the invention, operating power for the drive motor is supplied from the receiving zone end of the array of conveyor support frames through tubular passageways extending through the elongate members thereof.

In accordance with still other aspects of the invention, the conveyor support frame at the discharge end of the array is secured against relative movement with respect to the cable. The receiving zone end of the conveyor system is secured to the first vehicle by means of a bogie comprising levers having upper and lower ends. The levers are pivotally supported on the first vehicle at a point intermediate the upper and lower ends, and the cables and the receiving zone ends of the array of conveyor support frames are secured to the upper and lower ends of the levers, respectively. By this means the bogie functions to vary the tension on the conveyor belt in accordance with the total weight of material being transported by the conveyor system.

In accordance with another embodiment of the invention, the conveyor support structure comprises a conveyor support frame including a pair of elongate members extending substantially parallel to the cables from the receiving zone to the discharge zone. The conveyor belt support rollers are mounted transversely between the elongate members. The cables are adapted with a plurality of spaced pulleys along the length thereof, and the elongate members are adapted with a plurality of pulleys along their length. A support cable is threaded alternately between the cable pulleys and the pulleys of the elongate members such that the elongate members are suspended from the cables. The support cables are adjustable such that the elongate members, and thus the conveyor belt, may be raised and lowered relative to the cables by adjusting the length of the support cables.

In one embodiment of the invention, the elongate members comprise an array of tube members, with the tube members being engaged end to end with structure for permitting axial movement of the receiving zone end of the conveyor belt relative to the discharge zone end to permit tensioning of the belt. In another embodiment of the invention, cables are substituted for the tube members to make up the elongate member of the conveyor support frame. In each of the embodiments, the conveyor system is inwardly collapsible and is maintained in the extended position from the receiving zone end to the discharge zone end by applying an axially outwardly directed force on the ends of the conveyor system.

The present invention is further directed to numerous arrangements for controlling the tension on the conveyor belt in relation to the load being carried on the conveyor belt. These systems are designed to increase the tension on the conveyor belt as the loading on the belt increases and to reduce tension on the belt as the load on the conveyor belt is lightened. In one embodiment of the invention, the power required to drive the conveyor belt is monitored, and the structure for controlling the tension on the belt is adjusted in accordance with the required driving power in order to appropriately tension the belt.

DESCRIPTION OF THE DRAWINGS

A more complete understanding of the invention may be had by referring to the following detailed description when taken in conjunction with the accompanying drawings, wherein:

FIG. 2 is a side view of a portion of the conveyor system illustrated in FIGS. 1a and 1b;

FIG. 3 is a sectional view taken along the line 3—3 in FIG. 2 in the direction of the arrows;

FIG. 4 is a detailed view of the receiving end of the conveyor system;

FIG. 5 is a detailed view of the discharge end of the conveyor system;

FIGS. 10a, 10b and 10c comprise a somewhat diagrammatic illustration of an aerial conveyor system incorporating an alternative embodiment of the invention;

DETAILED DESCRIPTION

Figure 1A:
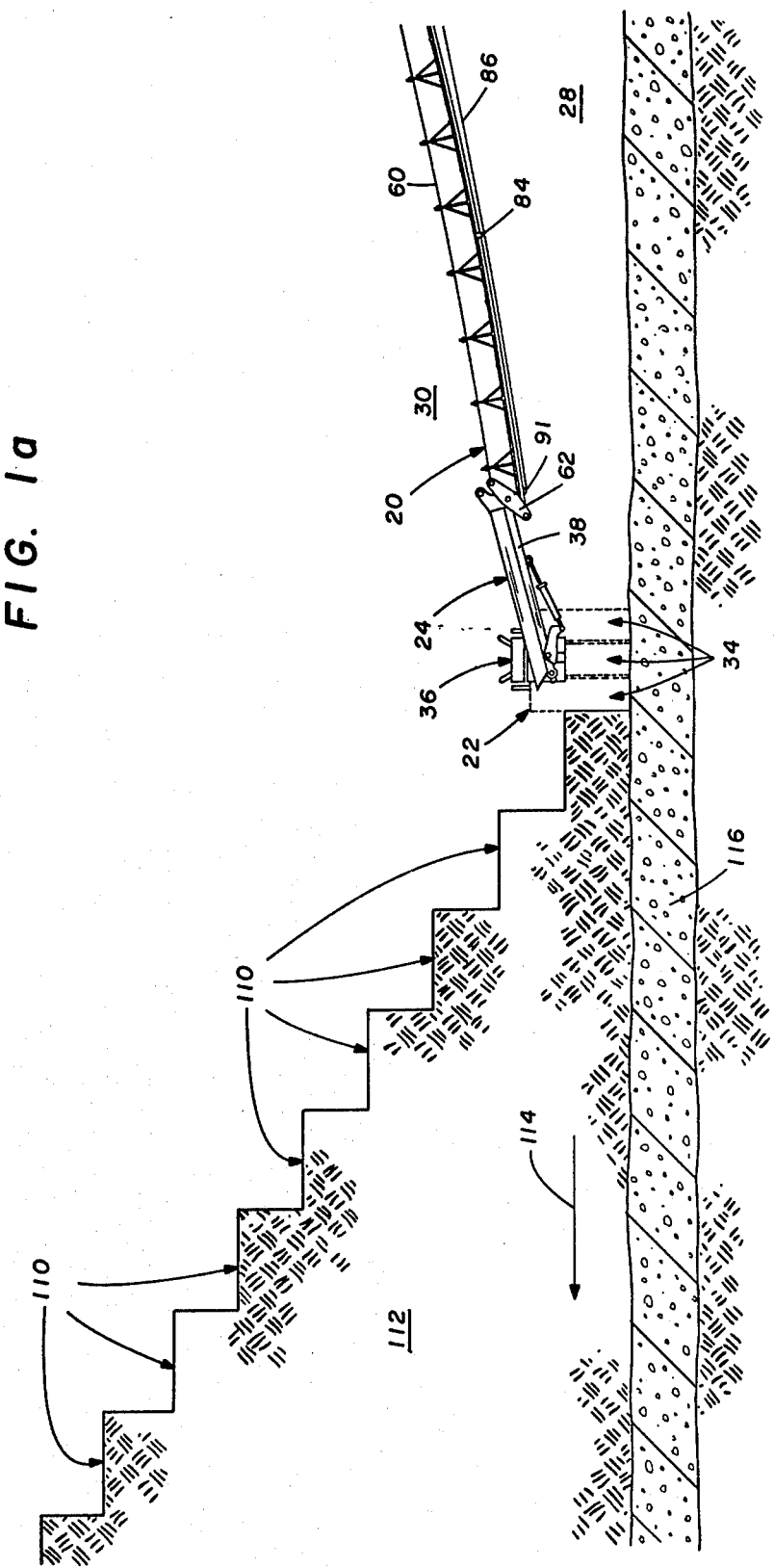
FIGS. 1a and 1b comprise a somewhat diagrammatic illustration of an aerial conveyor system incorporating the invention.
Figure 1B:
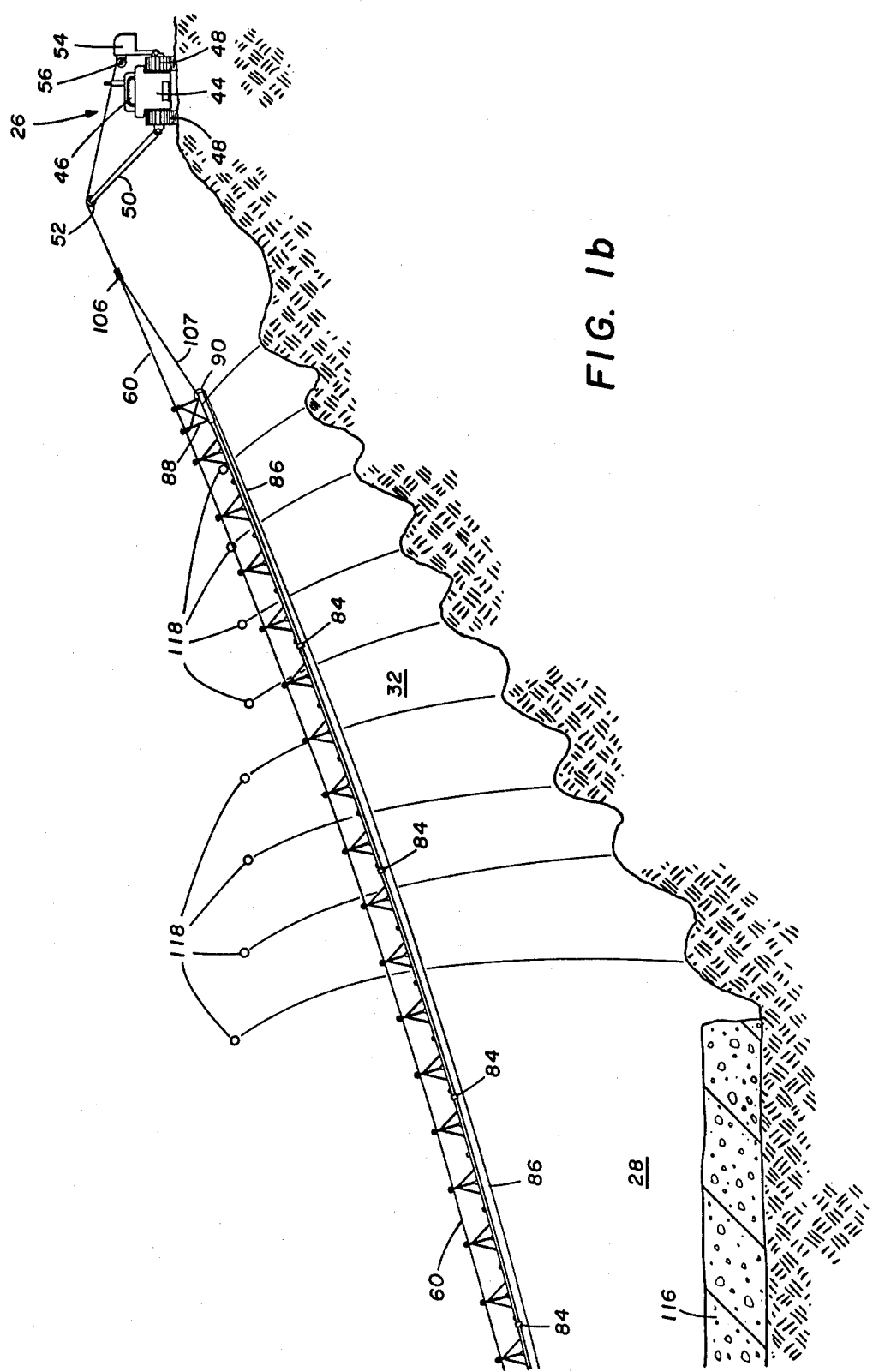

Referring now to the drawings, and particularly FIGS. 1a and 1b thereof, there is shown an aerial conveyor system 20 incorporating the invention. The aerial conveyor system 20 is supported at one end by a first vehicle 22 including a material delivery apparatus 24 and at the opposite end by a second vehicle 26. The vehicles 22 and 26 are separated by a substantial distance including a substantially open area 28. The function of the aerial conveyor system 20 is to transport material received in a receiving zone 30 from the delivery apparatus 24 of the first vehicle 22 across the open area 28 and to discharge the material in a discharge zone 32.

The vehicle 22 illustrated in FIG. 1a comprises an excavating and loading system of the type disclosed and claimed in the co-pending application of Charles R. Satterwhite, Ser. No. 435,296, filed Jan. 21, 1974, now U.S. Pat. No. 3,896,571, issued July 29, 1975, the disclosure of which is incorporated herein by reference. Such a vehicle comprises a plurality of excavating wheels 34 which function to excavate material and to discharge the excavated material onto a main conveyor 36. The main conveyor 36 in turn discharges the material onto a stinger conveyor 38 which comprises the material delivery system 24 of the vehicle 20.

The vehicle 26 comprises a deadman, and may be constructed in accordance with any of the conventional designs for such vehicles. The particular vehicle illustrated in FIG. 1b comprises a frame 44 which supports an engine 46, and a pair of tracks 48 which are actuated by the engine 46 to propel the vehicle. A boom 50 is supported on one side of the vehicle and extends to a pair of idler rollers 52. A counterweight 54 is mounted on the opposite side of the vehicle and supports a pair of constant tension winches 56.

The aerial conveyor system 20 includes a pair of spaced apart cables 60 which extend between the vehicles 22 and 26. The cables 60 are secured at one end to a bogie 62 which is pivotally supported on the discharge end of the material delivery system 24 of the vehicle 22. The opposite ends of the cables are secured to the constant tension winches 56 of the vehicle 26. By this means a predetermined tension is continuously maintained in the cables 60 regardless of the manipulation of one or both of the vehicles 22 and 26 to increase or decrease the distance therebetween.

Referring now to FIGS. 2 and 3, the aerial conveyor system 20 further comprises a plurality of conveyor support frames 64 which are supported by the cables 60. Each conveyor support frame 64 comprises a pair of tubes 66 extending below and substantially parallel to the cables 60. A series of frame members 68 extend upwardly from each tube 66, and the frame members on the opposite sides of the aerial conveyor system 20 are interconnected by bars 70. A hook roller 72 is mounted on each frame member 68 for engagement with the adjacent cable 60. Guard members 74 are provided for preventing disengagement of the cables 60 from the conveyor support frame 64 when the aerial conveyor system 20 is not in use, i.e., when the system is resting on a surface.

The tubes 66 of each conveyor support frame 64 are further interconnected by a series of beams 76 extending therebetween. A plurality of brackets 78 are mounted on the beam 76 and function to rotatably support a plurality of conveyor support rollers 80. The rollers 80 are further supported by brackets 82 mounted on the tubes 66.

Referring again to FIGS. 1a and 1b, the aerial conveyor system 20 comprises a plurality of conveyor support frames 64 supported end to end on the cables 60 and defining an array of support frames extending continuously from the material receiving zone 30 across the open area 28 to the material discharge zone 32. The ends of the tubes 66 of each frame are connected to the ends of the tubes of the adjacent frames by couplings 84. A conveyor belt 86 is mounted on the conveyor support frames and is actuated to transport material received from the delivery apparatus 24 of the vehicle 22 in the receiving zone 30 across the open area 28 and to discharge the material in the discharge zone 32. The array of conveyor support frames 64 extends to a frame 88 mounted at the discharge zone end of the array and fixedly secured to the cables 60. The frame 88 supports a drive roller 90 and a drive motor (not shown in FIG. 1b) which actuates the drive roller 90 to move the conveyor belt 86 around the conveyor course.

In accordance with the preferred embodiment of the invention, the drive motor mounted on the frame 88 comprises a hydraulic motor. Hydraulic fluid for actuating the drive motor is supplied from the vehicle 22 and is directed to the drive motor through the tubes 66 of the conveyor support frames 64 which extend along one side of the aerial conveyor system 20. Spent hydraulic fluid is returned from the motor to the vehicle 22 by means of the tubes 66 extending along the opposite side of the aerial conveyor system 20. By this means the tubes 66 serve not only as structural members for supporting the conveyor belt 86, but also as conduits for supplying operating power to the drive motor which actuates the conveyor. A further advantage to this construction relates to the fact that the presence of pressurized hydraulic fluid within the tubes 66 adds substantially to the strength and rigidity thereof.

Referring now to FIG. 1a, the aerial conveyor system 20 further comprises a roller 91 which defines the receiving zone end of the conveyor course. The roller 91 may comprise a driven roller or an idler roller in accordance with particular requirements. The bogie 62 comprises a pair of levers pivotally supported on the material delivery apparatus 24 of the vehicle 22. The cables 60 are attached to the upper end of the bogie 62, and the receiving zone ends of the tubes 66 of the conveyor support frames 64 are attached to the bottom end of the bogie 62. The point of pivotal connection of the bogie 62 to the material delivery apparatus 24 is adjustable so as to vary the mechanical advantage of the bogie.

Ths use of the bogie 62 to connect the aerial conveyor system 20 to the first vehicle 22 comprises a very important feature of the present invention. Thus, it will be understood that in order to transport substantial quantities of material by means of the conveyor belt 86, it is necessary to maintain substantial tension in the belt in order to prevent slippage. On the other hand, when the conveyor belt 86 is either unloaded or very lightly loaded, excessive tension in the belt would tend to cause bending of and/or other possible damage to the conveyor support frames 64.

Both of these problems are eliminated by means of the bogie 62. Thus, whenever the total weight of the material being carried by the conveyor belt 86 is increased, this weight is applied directly to the cables 60. Increased weight on the cables 60 tends to pivot the bogie 62 clockwise (FIG. 1a) thereby moving the lower end of the bogie 62 towards the first vehicle 22. As has been indicated, the frame 88 and the drive roller 90 carried thereby are fixedly mounted on the cable 60. However, the roller 91 is carried by the conveyor support frame at the receiving zone end of the aerial conveyor system 20. It will therefore be understood that an increase in the total weight supported by the conveyor system is effective by means of the bogie 62 to increase the distance between the rollers 90 and 91, thereby increasing the tension on the belt in proportion to the increase in weight carried thereby.

Conversely, whenever the total weight of the material carried by the conveyor belt 86 is reduced, the bogie 62 is pivoted counterclockwise (FIG. 1a). This action moves the roller 91 toward the roller 90, thereby reducing the tension in the conveyor belt 86. It will thus be understood that the bogie 62 functions to regulate the tension of the conveyor belt 86 in accordance with the total weight of material carried by the belt, thereby both providing sufficient tension in the belt during the transportation of substantial quantities of material and relieving tension in the belt when the belt is unloaded or lightly loaded so as to prevent damage to the conveyor support frame 64 due to excessive belt tension. As has been pointed out above, the bogie 62 is adapted for support on the material delivery apparatus at various points so as to regulate the mechanical advantage. By this means the extent of the belt tension change in response to a given change in the weight carried by the conveyor system is adjustable.

The structural details of the receiving zone end and of the discharge zone end of the aerial conveyor system 20 are illustrated in FIGS. 4 and 5, respectively. Referring first to FIG. 4, the receiving zone end of the conveyor system 20 comprises a pair of beams 92 which extend substantially parallel to the belt 86. The beams 92 are supported on the cables 60 by frame members 93 which are substantially similar to the frame members 68 of the conveyor support frames 64. The beams 92 in turn support tubing sections 94 which are coupled to the tubes 66 of the rear support frames 64. The ends of the tubing sections 94 are sealed by caps 94'.

The beams 92 also support apparatus 95 for adjusting the angular relationship of the roller 91 to the belt 86. In embodiments of the invention in which the roller 91 is driven, one or more hydraulic drive motors 96 are supported on the beams 92 and are connected to the roller 91. Pressurized hydraulic fluid is directed to the motor 96 and spent hydraulic fluid is removed therefrom by means of lines 97 extending from the vehicle 22. The lines 97 also extend to the tubing sections 94 and are connected thereto by means of couplings 98.

Referring now to FIGS. 5, the frame 88 at the discharge end of the conveyor system 20 is slidably supported on the tubes 66 by means of tubing sections 99. The tubes 66 extend through the tubing sections 99 and are plugged at their distal ends by means of caps 66'. One or more drive motors 100 are supported on the tubes 99 by means of brackets 101 and are operatively connected to the roller 90 by means of chain and sprocket drives 102.

Pressurized hydraulic fluid from the tubes 66 on one side of the conveyor system 20 is directed to the hydraulic motor 100 by means of a coupling 103 and a line 104. Spent hydraulic fluid from the motor 100 is directed to the tubes 66 on the opposite side of the conveyor 20 by means of a line 105 and a suitable coupling (not shown).

The frame 88 is secured against movement with respect to the cables 60 by means of clamps 106 and tie rods 107 connected thereto and extending to brackets 108 secured to the tubing sections 99. The tie rods 107 therefore serve to apply the tension of the cables 60 directly to the tubing sections 99 in order to prevent movement thereof relative to the cables 60. It will be understood, however, that the tubes 66 are free to slide within the tubing sections 99. By this means the bogie 62 is operable to vary the tension of the belt 86 in response to the total weight carried by the conveyor system 20.

In the use of the embodiment of the invention illustrated in FIGS. 1a and 1b, the first vehicle 22 is operated to cut a series of "step" 110 thereby progressively removing overburden 112 in the direction indicated by the arrow 114. By this means a seam of coal 116 is progressively uncovered in the same direction. Meanwhile, previously uncovered coal in the open area 28 is removed by means of conventional mining techniques.

Throughout the excavation of the overburden 112, material excavated by the vehicle 22 is received by the aerial conveyor system 20 in the receiving zone 30 from the material delivery apparatus 24 of the vehicle 22. The aerial conveyor system 20 functions to transport the material across the open area 28 and to discharge the material in the discharge zone 32. As will be appreciated by those skilled in the art, the vehicles 22 and 26 are manipulated such that the discharge zone 32 comprises a previously mined area of the strip mining excavation. During manipulation of the vehicle 22, the discharge end of the aerial conveyor system 20 is positioned at various points 118 whereby the previous contour of the overburden is restored in stairstep fashion in the manner illustrated in FIG. 1b.

Figure 6:
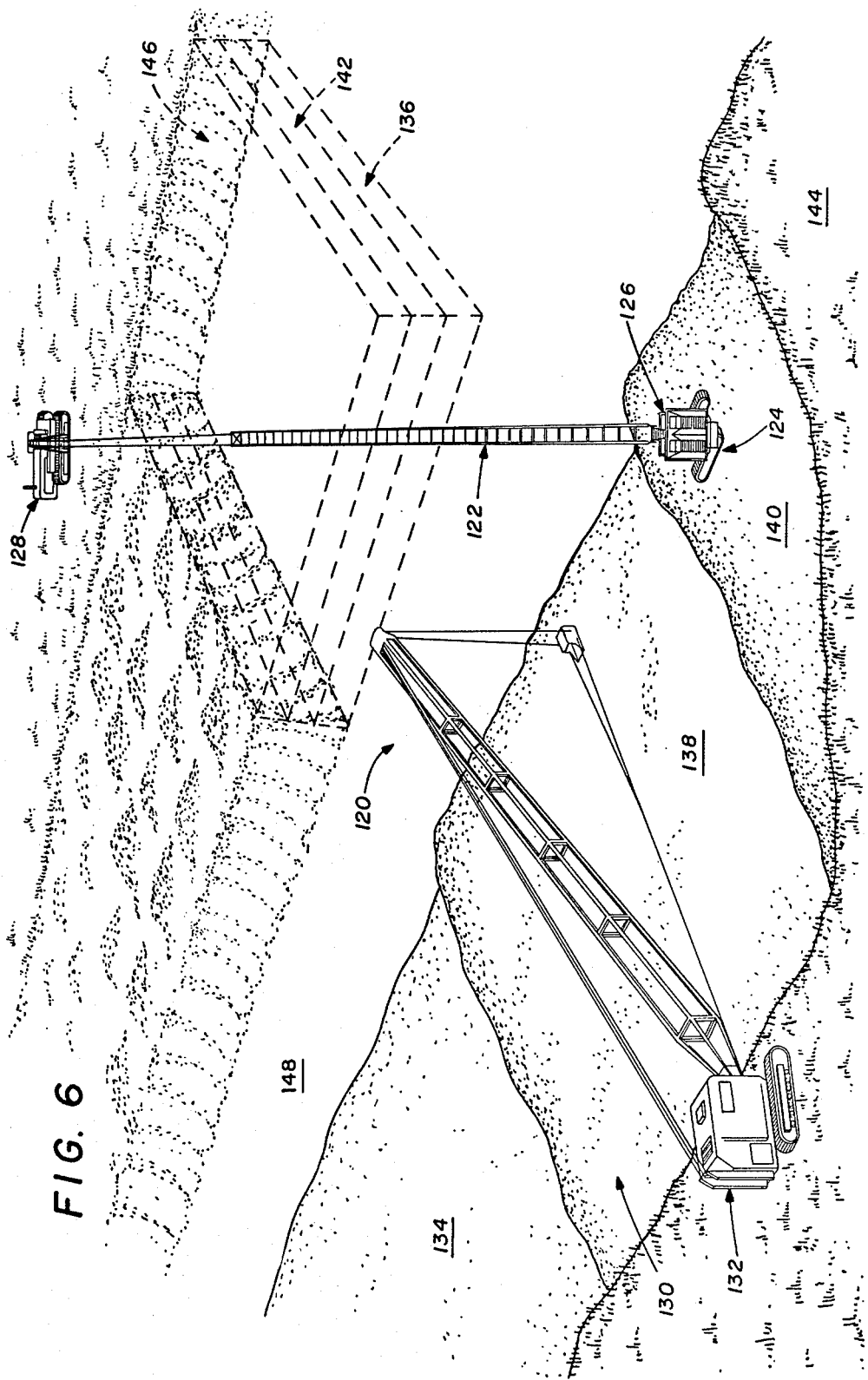
FIG. 6 is a somewhat diagrammatic illustration of a strip mining process incorporating the invention.

Referring now to FIG. 6, there is shown a strip mining process 120 incorporating the invention. The strip mining process 120 utilizes an aerial conveyor system 122 constructed substantially identically to the aerial conveyor system 20 illustrated in FIGS. 1a, 1b, 2 and 3. The aerial conveyor system 122 extends between and is supported by a hopper 124 including a material delivery apparatus 126 and a deadman 128. The deadman 128 may comprise any of the conventional designs for such vehicles.

In the practice of the strip mining process 120, overburden 130 is removed by means of a dragline 132, thereby progressively uncovering a seam of coal or other ore-bearing material 134. As the overburden is excavated, it is delivered by the dragline 132 to the hopper 124, and is in turn delivered from the hopper 124 to the aerial conveyor 122 by means of the material delivery apparatus 126. The aerial conveyor system 122 transports the material across the previously uncovered portion of the ore-bearing material 134 and discharges the material into a previously mined portion of the excavation.

In accordance with the present invention, the dragline 132 and the deadman 128 are operated to refill the previously mined portion of the excavation in such a way as to restore the mined area to productive usage. Thus, during the refilling of the lowermost zone 136 of a previously mined portion of the excavation, the dragline 130 is operated to move material from the lowermost zone 138 of the overburden 130. This material is delivered to the hopper 124, and is in turn delivered to the aerial conveyor system 122 for discharge into the lowermost zone 136 of the previously mined portion of the excavation. After the lowermost zone 136 has been refilled, the dragline 132 is operated to remove overburden from an intermediate zone 140. This material is delivered to the hopper 124 and hence to the aerial conveyor system 122, and is discharged by the aerial conveyor system into a zone 142 of the previously mined portion of the excavation which is positioned just above the lowermost zone 136. After the intermediate zone 142 of the previously mined portion of the excavation has been refilled, the dragline 132 is actuated to remove the topsoil zone 144 of the overburden 130. This material is deposited in the hopper 124 and is discharged by the aerial conveyor system 122 into the uppermost zone 146 of the previously mined area of the excavation.

It will thus be understood that in accordance with the strip mining process 120, a previously mined portion of the excavation is refilled in a series of zones with material removed from the corresponding zone of the overburden. This is highly advantageous in that by means of the process, the mined area is restored to exactly the same vertical configuration that it had prior to the mining operation. This in turn promotes the restoration of the mined area to productive usage, such as replanting of crops, grass and trees, etc. In this regard the fact that the topsoil is returned to the uppermost zone of the previously mined portion of the excavation is of major importance.

In addition to the foregoing, the use of the strip mining process 120 comprising the present invention results in various other advantages over the prior art. Thus, due to the length of the conveyor 122 it is possible to maintain a relatively wide strip 148 between the edge of the seam 134 and the edge of the refilled material. Since the strip 148 comprises part of the previously mined portion of the excavation, it is situated at a lower level than the upper surface of the seam 134. This permits rainwater, etc. to drain from the seam 134 into the strip 148. Assuming that the strip 148 is properly graded, the drainage water then flows into a sump location from which it may be pumped to the surface.

Another advantage deriving from the use of the invention relates to the fact that the relatively wide strip 148 prevents the refilled material from falling onto the surface of the seam 134. Those skilled in the art will appreciate the fact that the edge of the refilled material is often quite steep, and that it is therefore often necessary to shore up this edge, especially during periods of heavy rain. Such shoring operations are completely unnecessary in the practice of the present invention. Still another advantage relates to the fact that in the event a parting layer is encountered in the seam 134, it may be bulldozed into the strip 148, thereby eliminating the necessity of further excavating operations to uncover the remainder of the seam.

Yet another advantage deriving from the use of the invention relates to the fact that a minimum of rehandling of the excavated material is required during the refilling operation. Thus, by manipulating the deadman 128 during operation of the conveyor 122, it is possible to refill each of the zones 136, 142, and 146 by means of a series of relatively small piles. Then, in the event that it is considered desirable to form a relatively flat upper surface on a particular zone before starting the refilling of the next overlying zone, a minimum amount of bulldozing is required in order to complete the leveling operation.

Figure 7:
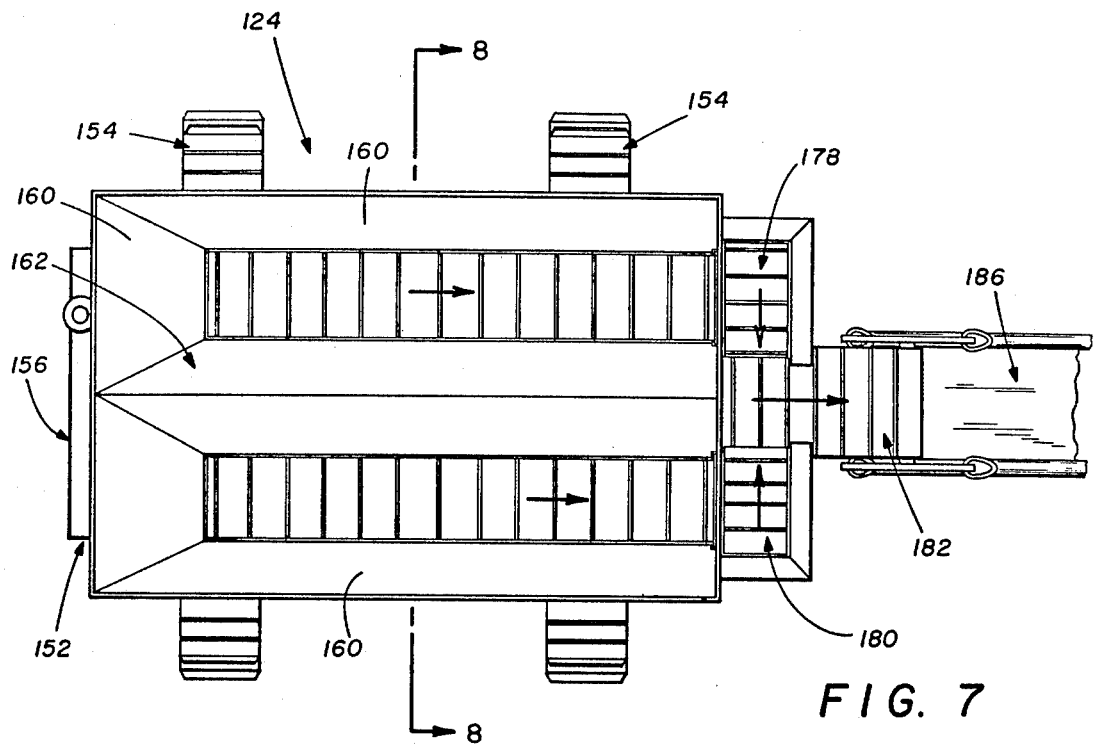
FIG. 7 is a top view of a hopper useful in the process illustrated in FIG. 6.
Figure 8:
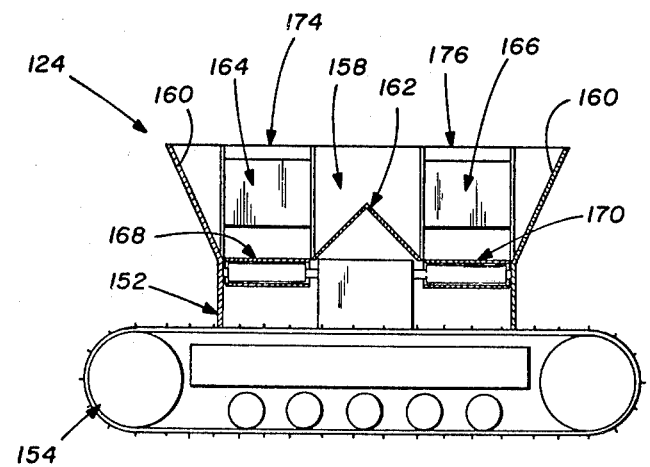
FIG. 8 is a sectional view taken generally along the line 8—8 in FIG. 7 in the direction of the arrows.

Referring now to FIGS. 7 and 8, the construction and operation of the hopper 124 utilized in the strip mining process shown in FIG. 6 are illustrated in greater detail. The hopper 124 comprises a frame 152 which is supported by a pair of conventional track assemblies 154. An engine 156 is mounted at one end of the frame 152 and functions to supply power for all the operating instrumentalities of the hopper 124.

The hopper 124 comprises an upper material receiving portion 158 defined by generally downwardly and inwardly tapered walls 160. A baffle 162 having an inverted V-shaped cross-section extends the entire length of the material receiving portion 158 of the hopper 124 and serves to divide the lower portion of the material receiving portion into first and second zones 164 and 166, respectively.

A conveyor 168 defines the bottom of the first zone 164, and a conveyor 170 defines the bottom of the second zone 166. The conveyors 168 and 170 function to transport material out of the material receiving portion 158 of the hopper 124 through a pair of vertically positionable gates 174 and 176, respectively. Material passing through the gates 174 and 176 under the action of the conveyors 168 and 170 is received on a pair of cross conveyors 178 and 180, respectively. The conveyors 178 and 180 deliver the material to a discharge conveyor 182, which in turn delivers the material to a conveyor 184 comprising the aerial conveyor system 122.

In the operation of the hopper 124, the gates 174 and 176 are set at heights corresponding to the maximum size rock that is to be transported on the conveyor 184 of the aerial conveyor system 122. The conveyors 168 and 170 are then operated at normal speed, which is approximately one-half the maximum operating speed of the conveyors. During normal operation, material received in the material receiving portion 158 is transported therefrom under the action of both the conveyor 168 and the conveyor 170 and is delivered to the aerial conveyor system 122 by means of the conveyors 178 and 180 and the conveyor 182.

Assume now that a rock larger than the maximum size rock which can safely be handled by the aerial conveyor system 122 is received in the material receiving portion 158 of the hopper 124. The baffle 162 causes the rock to fall either into the first portion 164 or the second portion 166. Assuming that the rock falls into the second portion 166, the gate 176 prevents the rock from passing onto the cross conveyor 180, and therefore prevents delivery of the rock to the aerial conveyor system 122.

As soon as the presence of a large rock in the second portion 166 of the hopper 124 is noticed, operation of the conveyor 170 is terminated. At the same time the operating speed of the conveyors 168 and 178 is substantially increased so that the same amount of material which was previously transported out of the hopper 124 by the conveyors 168 and 170 and the conveyors 178 and 180 operating in tandem is now transported out of the hopper 124 by means of the conveyors 168 and 178 operating singly.

Following the increase in the operating speed of the conveyors 168 and 178, the direction of operation of the conveyor 180 is reversed. The gate 176 is then opened and the conveyor 170 is actuated to deliver the large rock to the conveyor 180. Since the conveyor 180 is operating in reverse, this action causes the rock to be discharged to one side of the hopper 124 and not onto the aerial conveyor system 122.

Following the foregoing steps, the gate 176 is returned to its original position, the direction of operation of the conveyor 180 is re-reversed, and the operating speeds of the conveyors 168 and 178 are returned to normal. The normal operating parameters of the hopper 124 are retained until another rock too large to be handled by the aerial conveyor system 122 is encountered. At this point in time the foregoing steps are repeated to dispose of the large rock. It will be understood that if the rock should happen to come to rest in the first portion 164, the steps enumerated above regarding the second portion 176 will be carried out on the opposite sides of the hopper 124.

Figure 9:
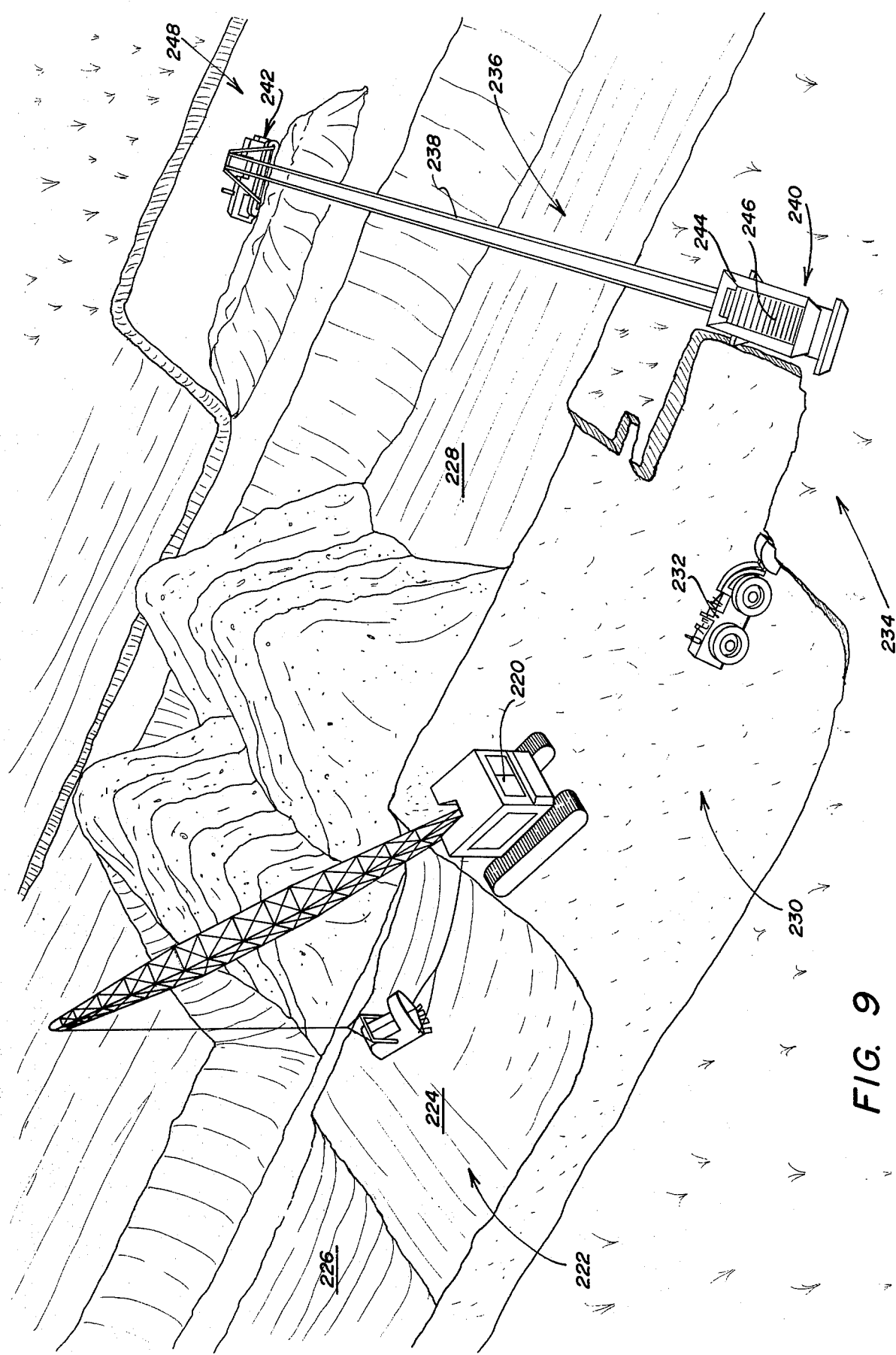
FIG. 9 is a somewhat diagrammatic illustration of an alternative strip mining process incorporating the invention.

FIG. 9 illustrates an alternative method of restoring a previously mined portion of the excavation to the same vertical soil composition configuration which it had prior to the mining operation. In accordance with this embodiment of the invention, a drag line 220 is operated in an area 222 from which the uppermost zone of material or topsoil and the intermediate zone of material have been previously removed. Drag line 220 operates to remove the lowermost zone of material 224 in the area 222 until a seam of coal or other ore-bearing materials 226 is exposed for withdrawal in the mining operation. The lowermost zone of material 224 is discharged by drag line 220 into the lowermost zone of the area 228 from which coal or other ore-bearing material has already been removed. Thereafter, drag line 220 moves to an area 230 from which the intermediate zone of material is removed and deposited above the lowermost zone of material previously deposited in area 228.

Subsequent thereto, a topsoil removing unit, such as tractor and scoop unit 232, is used to remove a topsoil layer in the area 234 and deposits it for delivery by aerial conveyor system 236. The strip mining process illustrated in FIG. 9 utilizes an aerial conveyor unit 238 constructed substantially identical to the aerial conveyor system 20 illustrated in FIGS. 1a, 1b, 2 and 3. Alternatively, aerial conveyor unit 238 may be constructed in accordance with the aerial conveyor system to be hereinafter described. Aerial conveyor system 236 includes a conveyor unit 238 extending between and supported by a motorized vehicle unit 240 and a deadman unit 242. Vehicle unit 240 includes a hopper 244 and a material delivery apparatus 246. The deadman unit 242 may comprise any of the conventional designs for such vehicles or may be designed in accordance with the deadman unit to be hereinafter described.

As the topsoil layer is excavated by tractor and scoop unit 232, it is delivered to hopper 244 of the vehicle 240 and is in turn delivered by hopper 244 to the aerial conveyor unit 238 by means of material delivery apparatus 246. The aerial conveyor system 236 transports the material to an area which has been previously mined and at which both the lowermost zone and intermediate zone of subsurface soil has been replaced, such as area 248 illustrated in FIG. 9.

It will thus be understood that in accordance with the strip mining process illustrated in FIG. 9, a previously mined portion of the excavation is refilled in a series of zones with material recovered from a corresponding zone of overburden. This is accomplished by systematically working a drag line, a top soil removing unit, and an aerial conveyor system between the excavated and unexcavated areas to remove and replace the various layers of overburden and top soil. By means of this process, the mined area is restored to the same vertical soil content configuration that it had prior to the mining operation. This in turn promotes the restoration of the mined area to productive usage as existed prior to the mining operation.

Figure 10A:
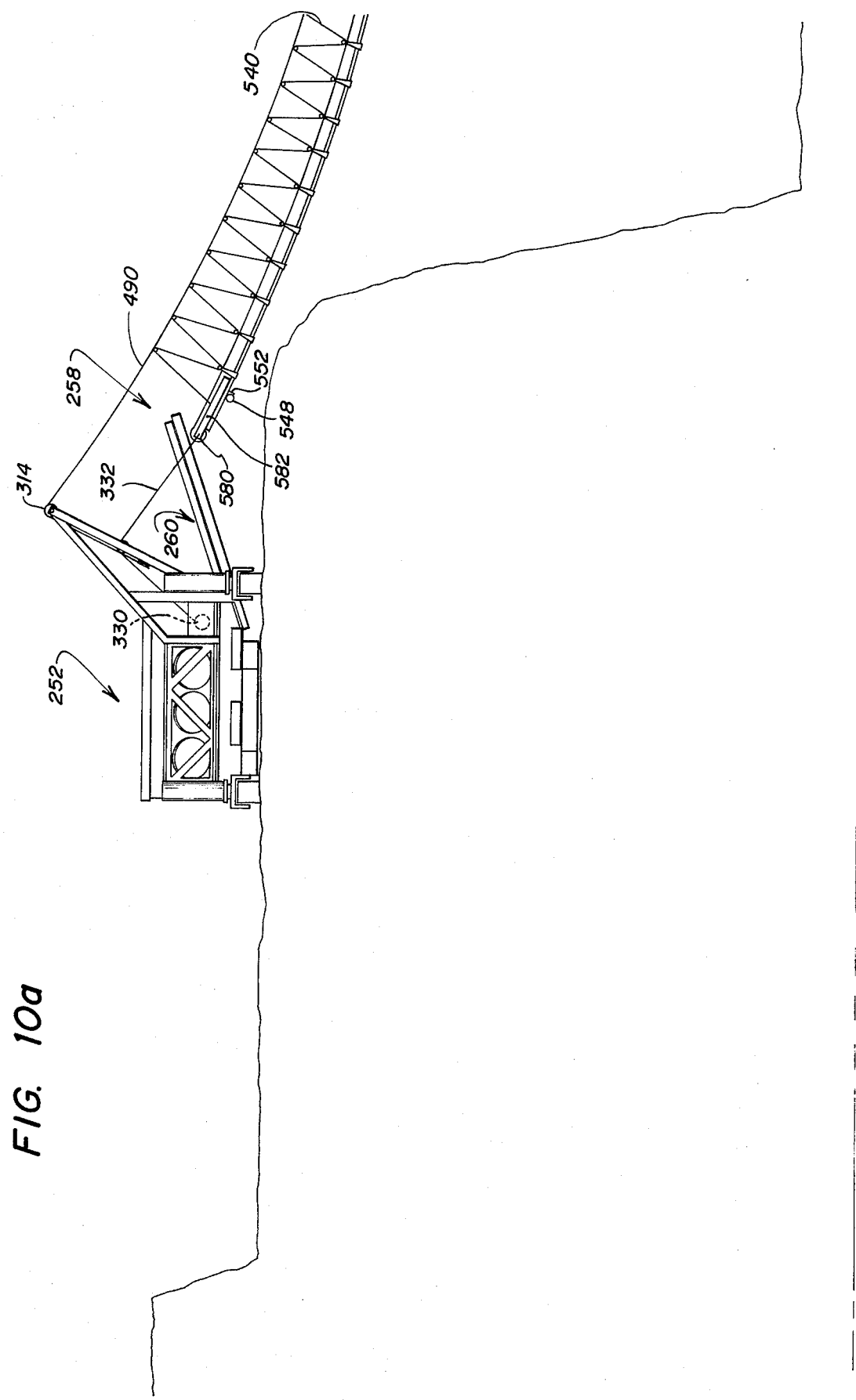

FIGS. 10a, 10b and 10c illustrate an aerial conveyor system 250 incorporating an alternative embodiment of the conveyor system of the present invention. Aerial conveyor system 250 is supported at one end by a first vehicle 252 and at the opposite end by second vehicle 254. Vehicles 252 and 254 are separated by substantial distance including a substantially opened area 256. The function of aerial conveyor 250 is to transport material received in a receiving zone 258 from the delivery apparatus 260 of first vehicle 252 across the open area 256 and to discharge the material in a discharge zone 262.

Figure 11:
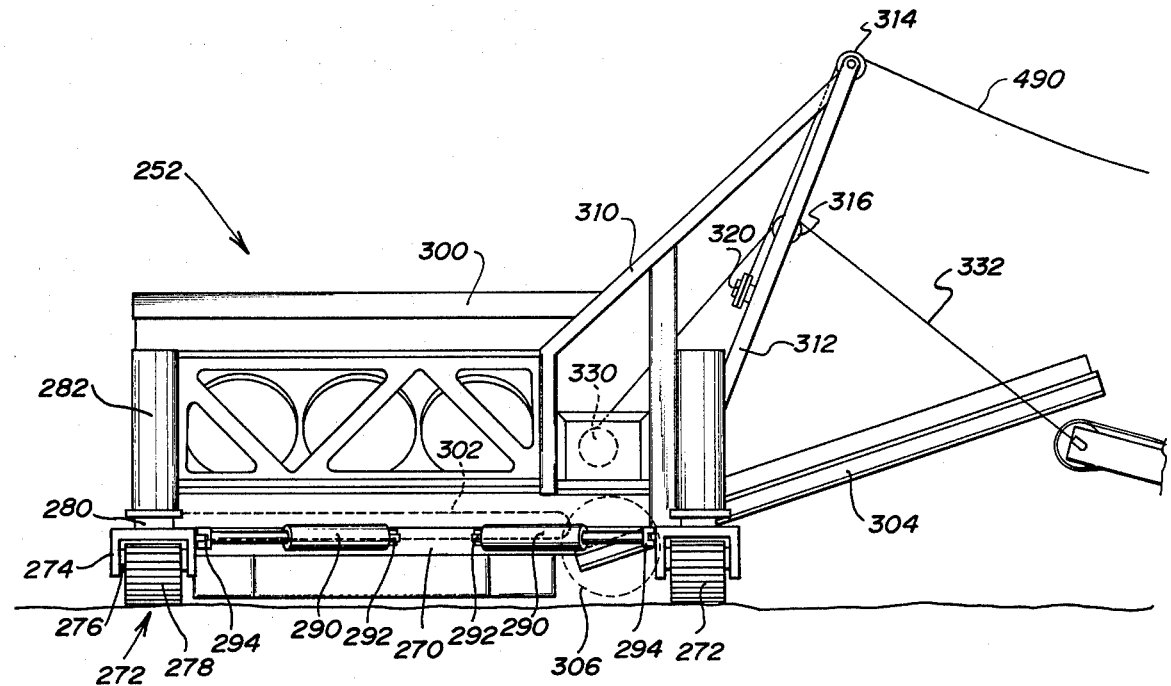
FIG. 11 is a plan view of the vehicle illustrated in FIG. 10a for supporting one end of the conveyor system illustrated in FIGS. 10a–10c.
Figure 12:
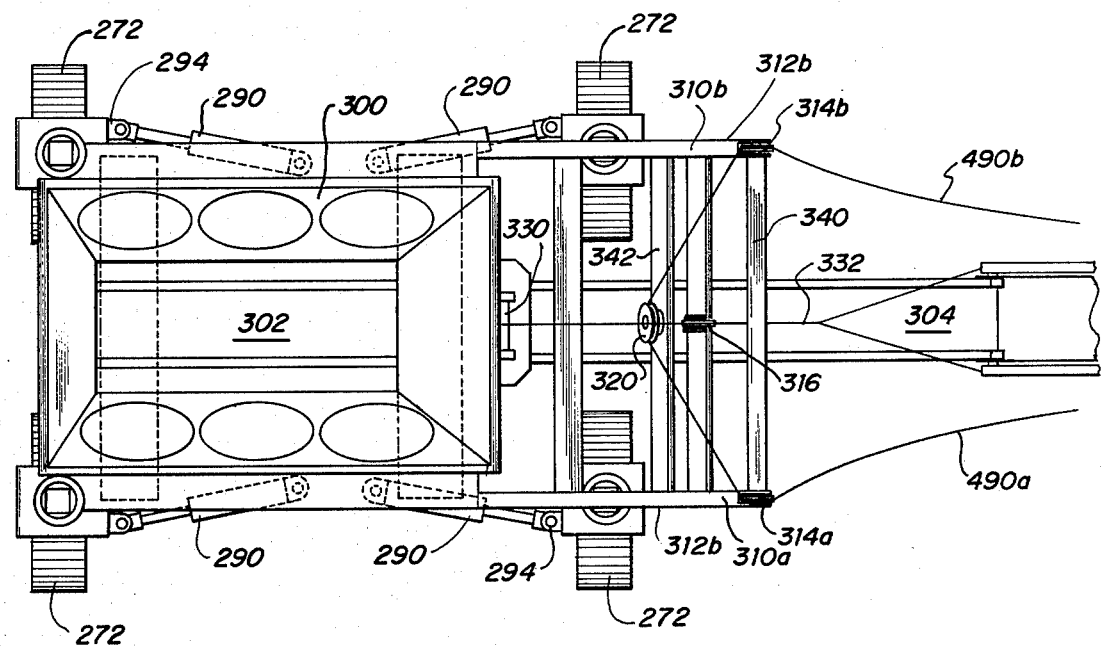
FIG. 12 is a top view of the vehicle illustrated in FIG. 11.

Vehicle 252, illustrated in more detail in FIGS. 11 and 12, comprises a frame structure 270 supported for movement on four independent tracks 272. Each track 272 includes a collar 274 supporting a pair of drums 276 about which a track belt 278 rotates. Collar 274 is attached to a piston shaft 280 which slidably engages cylinder 282 fixedly attached to frame 270. With this arrangement, tracks 272 may be independently raised and lowered relative to frame structure 270 by extending or retracting piston shafts 280 out of or into cylinders 282 attached to frame structure 270. This arrangement permits the maintainence of frame structure 270 horizontal while vehicle 252 moves along an inclined surface. Tracks 272 are steerably attached to frame 270 by hydraulic cylinders 290. Cylinders 290 are connected between frame structure 270 and collar 274 by suitable pins 292 and 294, respectively. By extending and retracting cylinders 290, tracks 272 may be pivoted about piston shaft 280 in order to direct vehicle 252 along a desired course.

Attached to frame structure 270 is a hopper 300 which is adapted for receiving and discharging excavated material onto a conveyor element 302 for discharge of material onto a stinger conveyor 304. Conveyor element 302 and stinger conveyor 304 comprise the material delivery apparatus 260 of vehicle 252.

A braker attachment 306 is interconnected between conveyor element 302 and stinger conveyor 304. The function of the braker attachment is to segregate larger rocks and pieces of material from the remainder of the excavated material so that such material may be broken into smaller particles prior to delivery to the conveyor system.

Boom struts 310 and 312 extend upwardly from frame structure 270 and hopper 300 and are joined at their ends remote from frame 270 and hopper 300. The point of connection of struts 310 and 312 is fitted with a pulley system 314. A second pulley system 316 is supported from strut 312 intermediate of the point of contact of strut 312 with frame 270 and the location of pulley system 314 on strut 312. An equalizing sheave 320 is likewise supported on strut 312.

A winch 330 is attached to frame 270 and feeds out a cable 332 which is entrained around pulley system 316 and extends to the receiving zone end of the aerial conveyor system 250. Stinger conveyor 304 rests above the receiving zone end of the aerial conveyor. Conveyor 304 is appropriately hinged at its end attached to vehicle 252 and thus may be pivoted about such hinged connection as the aerial conveyor system 250 is moved relative to vehicle 252 by drawing in and letting out cable 332.

As is illustrated in FIG. 11 and FIG. 12, boom struts 312 include two spaced parallel arms 310a and 310b which are interconnected at their ends remote from vehicle 252 by a bar 340. Boom struts 312 likewise consists of a pair of spaced parallel arms 312a and 312b which join arms 310a and 310b at their point of connection to bar 340. Pulley system 314 consists of pulleys 314a and 314b fitted at the outermost end of arms 310a and 310b, respectively. Sheave 320 is rotationally attached to a cross bar 342 which is interconnected between arms 312a and 312b.

Figure 13:
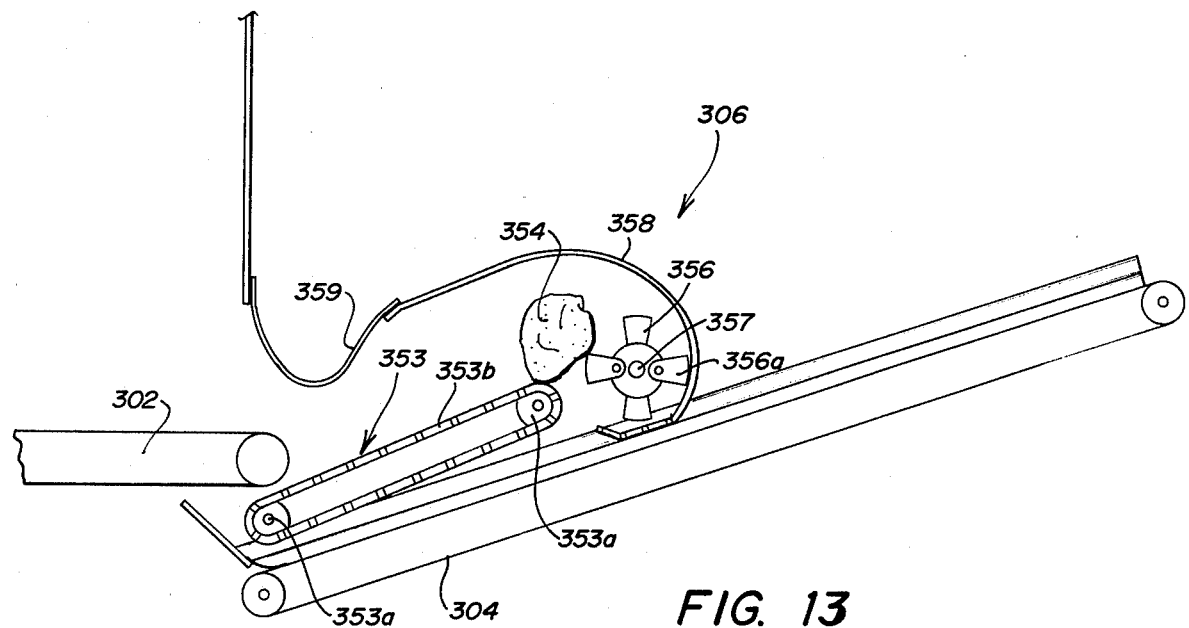
FIG. 13 is an enlarged view of the breaker attachment used in conjunction with the vehicle illustrated in FIGS. 11 and 12.

FIG. 13 illustrates a preferred embodiment of braker attachment 306. The braker attachment includes a bar conveyor 353 which is composed of rotatable drums 353a and a plurality of conveyor belt units 353b appropriately spaced to permit the passage of excavated material from conveyor unit 302 onto stinger conveyor 304. The conveyor belt units 353b of bar conveyor 353 are so spaced as to prevent the passage of larger rocks and pieces of material, such as that indicated generally by the reference numeral 354, between the units. Bar conveyor 353 is positioned adjacent to and below the discharge end of conveyor element 302 in order that material being discharged from conveyor unit 302 is deposited on or passes through bar conveyor 353 according to the size of the particles deposited thereon. A rotatable hammer mill 356 is located adjacent the discharge end of bar conveyor 353 and consists of a plurality of crushing blades 356a. Hammer will 356 is adapted for rotation about an axis 357 parallel to the axis of rotation of drums 353a of the bar conveyor. A shield 358 is positioned adjacent to and around hammer mill 356. Drums 353a are driven by a suitable motor in order to impart rotation to belts 353b of bar conveyor 353.

In operation of the bar conveyor, larger rocks and pieces of material 354 move from conveyor unit 302 and are carried by the belt units of bar conveyor 353 into blades 356a or rotating hammer mill 356. The rocks and materials are crushed by the action of the hammer mill 356 against shield 358 such that the smaller crushed particles fall, under the action of gravity, onto stinger conveyor 304 to be carried to the aerial conveyor system. A flexible mat 359 provides access into the area of the bar conveyor to facilitate repairs and the like. Mat 359 likewise allows movement of shield 358 relative to hammer mill 356 during the crushing process.

The vehicle 254 comprises a specially constructed deadman unit. Illustrated in FIG. 10c, and in more detail in FIGS. 14 and 15, vehicle 254 comprises a frame structure 360 supporting a prime mover 362 and supported by four independent tracks 364. Similar to the track arrangement discussed with respect to vehicle 252, a collar 366 is adapted with an axis shaft 368 to which track rollers 370 (not shown) are attached. Track belt 372 is fitted for rotation about track rollers 370 to complete track 364. A ram shaft 374 is attached to collar 366 and extends upwardly to mate within cylinder 376 fixedly attached to frame 360. As discussed earlier with respect to vehicle 252, ram shaft 374 may be extended or withdrawn relative to cylinder 376 such that frame 360 may be maintained horizontal while vehicle 254 traverses an incline. Hydraulic cylinders 378 are interconnected between frame 360 and tracks 364 by suitable pins 380 and 382, respectively. Thus, tracks 364 may be steered by appropriately actuating cylinders 378 to pivot tracks 364 relative to frame 360.

Figure 15:
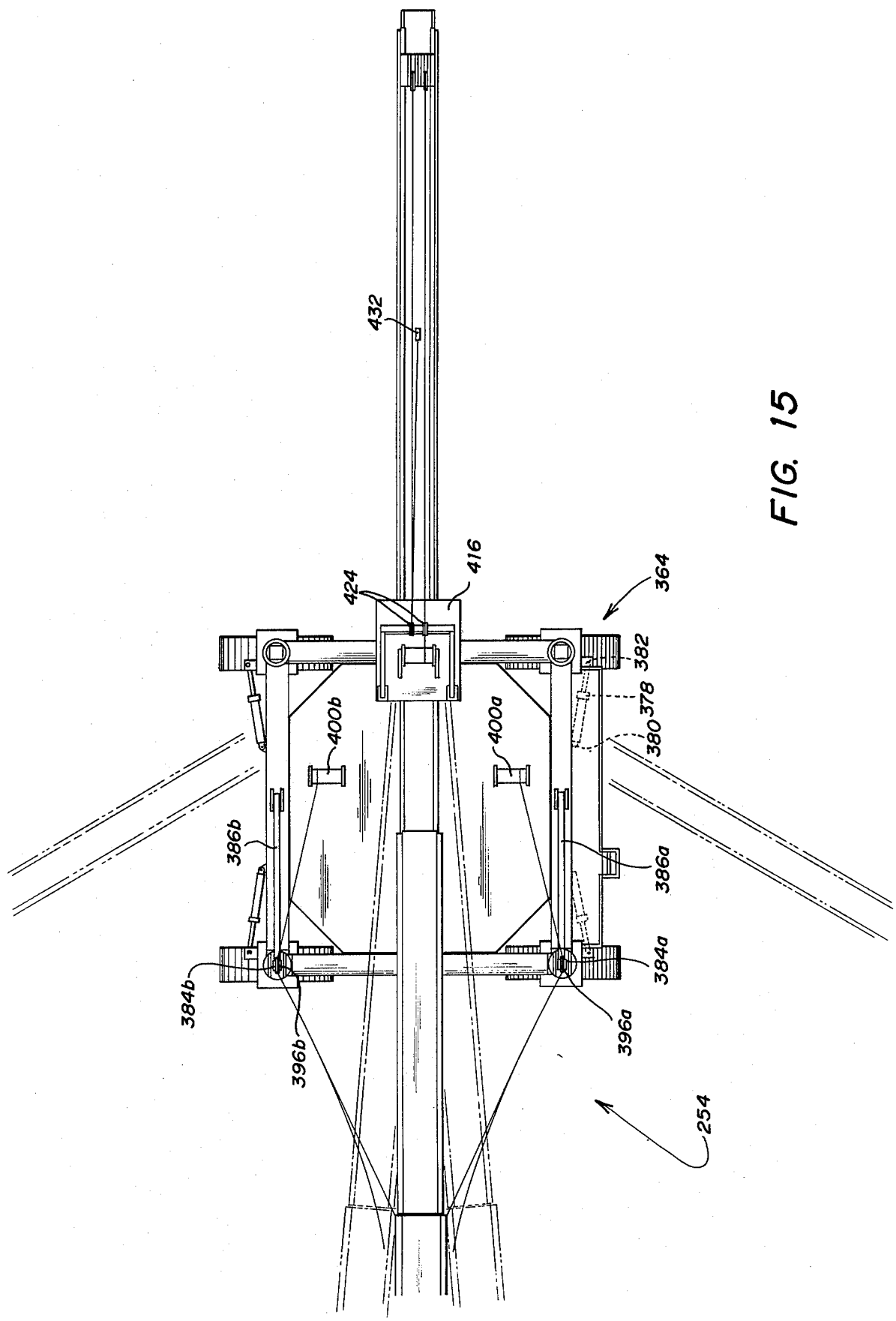
FIG. 15 is a top view of the vehicle illustrated in FIG. 14.

Boom struts 384 and 386 extend upwardly from frame 360 and converge at apex 388 where they are appropriately joined at pin 390. Struts 384 and 386 are appropriately pinned at their ends opposite apex 388 to frame 360 by pin members 392 and 394, respectively. A pulley system 396 is adapted at the end of strut 384 remote from frame 360. Referring to FIG. 15, it may be seen that struts 384 and 386 include spaced parallel struts 384a and 384b, and 386a and 386b, respectively. Likewise, pulley system 396 includes pulleys 396a and 396b rotatably attached at the upper end of struts 384a and 384b, respectively. Frame 360 of vehicle 254 supports a pair of constant tension winches 400a and 400b adjacent the point of connection of strut 386 to vehicle 254.

Vehicle 254 is further adapted with a conveyor system 402 capable of conveying material delivered from discharge zone 262 of aerial conveyor system 250 to a selected deposit location adjacent vehicle 254. Conveyor system 402 includes a spreader conveyor 404 rotatably supported from vehicle 254 and a telescoping conveyor 406 supported between spreader conveyor 404 and aerial conveyor system 250. Spreader conveyor 404 consists of a lattice frame structure 408 rotatably suspended at hub 409 from frame 360 of vehicle 254. Supported within frame structure 408 is a conveyor belt 410 entrained about rotatable drums 412 and 414. Conveyor belt 410 is appropriately driven by rotating drum 412 by a suitable power source (not shown).

A superstructure 416 extends from hub 409 and is adapted to support brace members 418 and 420 extending upwardly from superstructure 416 and joined at axis shaft 422. A pair of double pulleys 424 are attached at the point of connection of braces 418 and 420 and rotate about axis shaft 422a and 422b, respectively. A second pulley 426 is supported by bracket 428 and is rotatable about axis shaft 430 at the end of frame 408 of spreader conveyor 404. A cable 431 extends from a bracket 432 intermediate of the end of spreader conveyor 404 and its points of connection of vehicle 254. Cable 431 is entrained alternately around pulley system 424, pulley 426 and again pulley system 424 and thereafter joined to winch 434 supported by bracket 436 on superstructure 416. By activating winch 434 to draw in cable 431, spreader conveyor 404 may be raised and lowered in a vertical plane about its pivotable point of connection to vehicle 254 at hub 409.

Hub 409 is further adapted for rotation relative to vehicle 254 about a vertical axis. A suitable power source (not shown) is supported by frame 360 and is selectively actuatable to rotate hub 409 and thereby swing spreader conveyor 404 through a 120° arc to each side of the longitudinal axis of vehicle 254. In this way, spreader conveyor 44 may be adjusted upwardly and downwardly in a vertical plane and pivoted from side to side about vehicle 254 to selectively discharge materials carried on conveyor belt 410 to a desired position.

Telescope conveyor 406 consists of two separate conveyor units 450 and 452. Each unit consists of rotatable drums 454 and 456 positioned at each end of the conveyor unit and supported for rotation on either side thereof by channels 458. Drums 454 and 456 are adapted to accept a conveyor belt 460 for rotation thereabout. Drums 454 are suitably rotated by a suitable power source (not shown) in order to drive conveyor belts 460. One end of conveyor unit 452 is pivotally supported from superstructure 416 of spreader conveyor 404 by support arms 470. Pivoting of arm 470 is about pivot structure 472. Arms 470 are so positioned as to permit discharge of the materials from belt 460 onto spreader conveyor 404. The opposite end of conveyor unit 452 is suspended from conveyor unit 450 by straps 474 which position rollers 476 within upper and lower caps of channel 458 of conveyor unit 450. Likewise, one end of conveyor unit 450 is supported from conveyor unit 452 by straps 478 extending from conveyor 450 and supporting rollers 480 for movement between the upper and lower caps of channel 458 of conveyor unit 452. The opposite end of conveyor unit 450 is pivotally attached to the discharge end of aerial conveyor unit 250. Thus, it may be seen that conveyor units 450 and 452 may be telescoped axially one relative to the other as the aerial conveyor system moves toward or away from vehicle 254. Similarly, conveyor units 450 and 452 may be telescoped forward or away from the other as vehicle unit 254 moves away from aerial conveyor 250.

Figure 14:
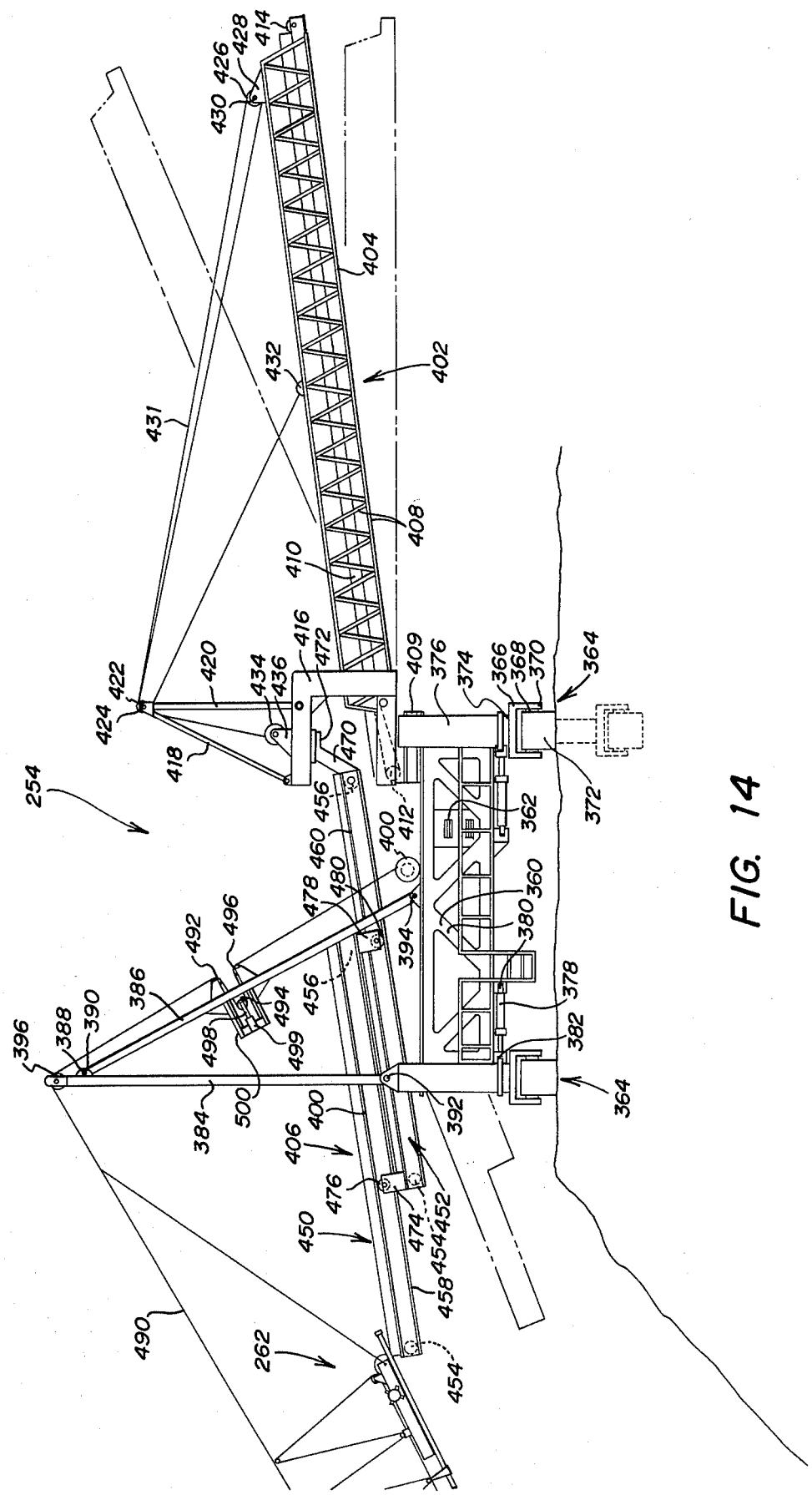
FIG. 14 is a plan view of the vehicle illustrated in FIG. 10c for supporting one end of the conveyor system.

Aerial conveyor system 250 is suspended between first vehicle 252 and second vehicle 254. The conveyor system 250 includes a cable 490 extending between vehicles 252 and 254 from which the conveyor system components are suspended. As may be seen in FIGS. 11 and 12, cable 490 is attached to vehicle 252 by being looped at its mid-point about equalizing pulley sheave 320 with one-half of the cable, designated 490a, extending over pulley 314a and the opposite half of the cable, designated 490b, extending over pulley 314b. Both halves of cable 490 extend from this connection at vehicle 252 to vehicle 254 wherein the ends of cable 490a and 490b are entrained over pulleys 396a and 396b, respectively, and attached to winches 400a and 400b, respectively (FIGS. 14 and 15). Thus, cable 490 extends from constant tension winch 400a on vehicle 254 around equalizing sheave 320 on vehicle 252 and back to vehicle 254 where the opposite end of the cable is attached to winch 400b.

Intermediate of pulleys 396a and 396b and constant tension winches 400a and 400b, cable 490 travels around three triangularly spaced pulleys 492, 494, and 496. Pulleys 492 and 494 are fixedly attached to strut 386 while pulley 496 is attached to the movable arm 498 of hydraulic cylinder 499 attached to frame structure 500 of boom strut 386. As will hereinafter be described in greater detail, the tension on cable 490 is systematically adjusted by the actuation of hydraulic cylinders 499 on vehicle 254 and winches 400a and 400b on vehicle 254.

Figure 16:
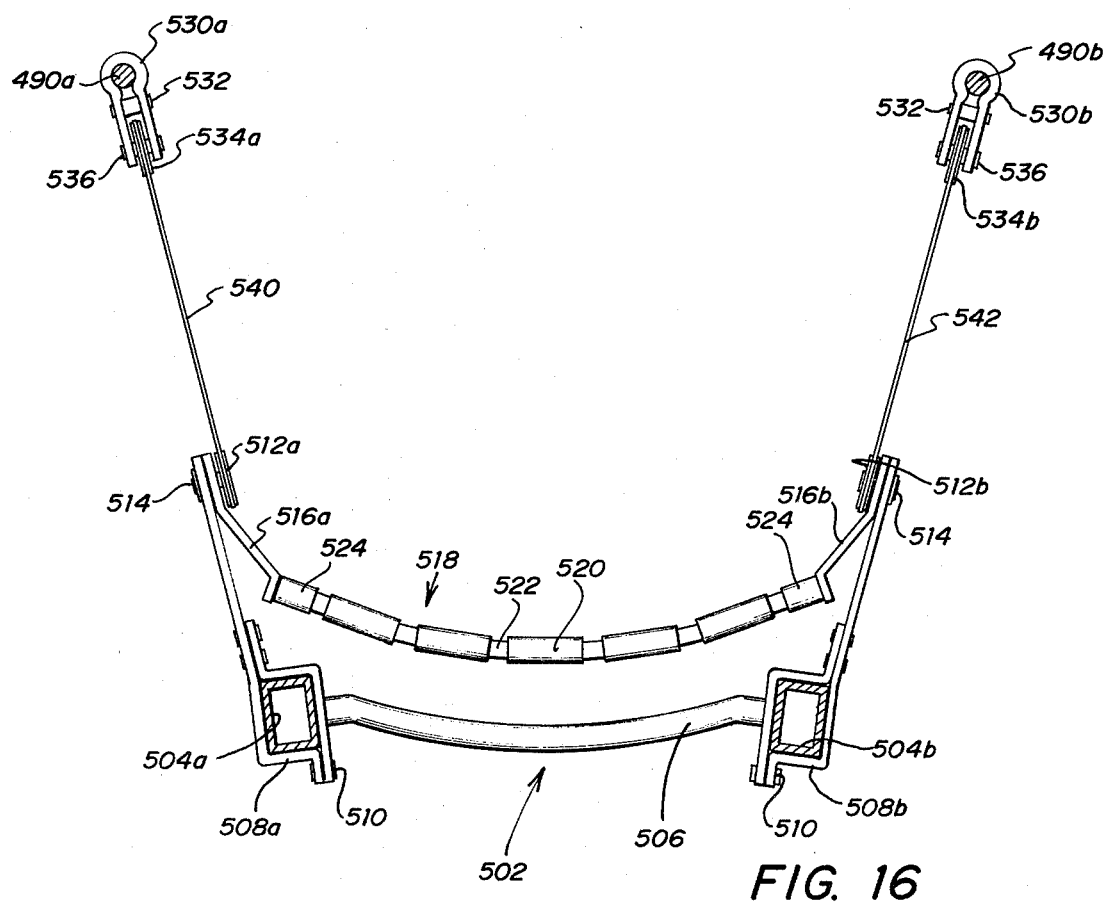
FIG. 16 is a section view taken along line 16—16 of FIG. 10b looking in the direction of the arrows.

FIG. 16 illustrates a cross-section view of the conveyor system of the present invention. Referring to FIG. 16 in conjunction with FIG. 10b, the aerial conveyor system 250 further comprises a plurality of conveyor support frames 502 which are supported by cable 490. Each conveyor support frame 502 comprises a pair of tubes 504a and 504b extending below and substantially parallel to cable 490. Tubes 504a and 504b of each conveyor support frame 502 are interconnected by a series of beams 506 extending therebetween. Equally spaced along tubes 504a and 504b are a plurality of support straps 508a and 508b, respectively, which are fixedly attached around tubes 504a and 504b and suitably fastened thereto such as by fasteners 510. Straps 508 rotatably support a pulley 512 which is pinned to strap 508 by a suitable axis shaft 514. Also extending from straps 508a and 508b are ears 516a and 516b. Conveyor support rollers 518 are interconnected between corresponding ears 516a and 516b extending from straps 508a and 508b. Conveyor support rollers 518 include a plurality of symmetrical rollers 520 integrally molded on a cable 522 which are adapted for rotation at each end in suitable bearing structures 524 which are in turn suitably attached to ears 516.

Referring to FIG. 16, straps 530a and 530b are appropriately clamped to cables 490a and 490b, respectively, by fasteners 532. Straps 530a and 530b extend below cable 490 and are adapted to receive pulleys 534a and 534b, respectively, which are pinned to straps 530a and 530b by axis shaft 536.

Referring now to FIG. 10b and FIG. 16, support cables 540 and 542 are fixedly attached at one end to fittings 543 which join adjacent support frames 502 at a point intermediate of vehicle unit 252 and vehicle unit 254. Cable 540 extends from fittings 543 and is alternately entrained about pulleys 534a and 512a. Cable 542 is likewise alternatively entrained about pulleys 534b and 512b thereby supporting the conveyor support frame 502 and conveyor support rollers 518 from cable 490. Cables 540 and 542 are attached at their ends remote from attachment to fitting 543 to winches 548 (FIG. 10a) supported at the receiving zone end of the conveyor system 250 adjacent vehicle 252. Winches 548 are adapted for drawing up and letting out cables 540 and 542 to appropriately position the conveyor support frame, and therefore the conveyor support rollers relative to cable 490. Correspondingly, cables 544 and 546 (not shown) extend from fitting 543 and are alternatively entrained about pulleys 512 and 534 with their ends remote from the point of attachment to fittings 543 being attached to winches 550 (FIG. 10c) supported at the discharge zone end of the aerial conveyor system 250 adjacent vehicle 254. Winches 550 perform as do winches 548 by drawing in and letting out cables 544 and 546 to adjust the relative position of the conveyor support frames and conveyor support rollers relative to cable 490.

Referring again to FIGS. 10a, 10b and 10c, the aerial conveyor system 250 comprises a plurality of conveyor support frames 502, supported end to end by cable 490 and defining an array of support frames extending continuously from material receiving zone 258 across the open area 256 to material discharge zone 262. The ends of tubes 504 of support frames 502 are connected to the ends of the tubes of adjacent frames by couplings 560. A conveyor belt 562 is mounted on the conveyor support frames and is actuated to transport material received from the delivery apparatus 260 of vehicle 252 in the receiving zone 258 across the open area 256 and to discharge the material in the discharge zone 262. The array of conveyor support frames 502 extends to a frame 564 mounted at the discharge end of the array. Frame 564 supports a drive roller 566 and a drive motor (not seen in FIG. 10c) which actuates drive roller 566 to move the conveyor belt 562 around the conveyor course. In accordance with one preferred embodiment of the present invention, drive motor 568 mounted on frame 564 comprises a hydraulic motor. Hydraulic fluid for actuating the drive motor is supplied from vehicle 254 and is directed to the drive motor through tubes 570. Alternatively, the drive motor is electrically powered with the source of electrical energy being provided from vehicle 254.

A protective wire mesh 572 encircles conveyor system 250 for a distance along its midsection. Wire mesh 572 extends below and to the side of the conveyor system in order to prevent materials being carried by the conveyor from falling therefrom. Thus, an area under the conveyor system is made safe for passage by individuals and operation of other machinery. A marker 574 such as a hanging rope or other identifing structure, is positioned near the center of the conveyor system but slightly downstream of the midpoint of the conveyor. This marker indicates the most desirable point beneath the conveyor system for passage under the conveyor. The marker is past the midpoint of the conveyor system, and the wire mesh encircling the system, to allow for the forward trajectory due to inertia of material falling from the conveyor system immediately before the protective wire mesh.

Referring now to FIG. 10a, the aerial conveyor system 250 further comprises a roller 580 which defines the receiving zone end of the conveyor course. Roller 580 may comprise a driven roller or an idler roller as required by the particular system. Roller 580 is supported within a frame 582 which is attached at one end to cables 332 extending from winch 330 on vehicle 252.

Figure 17:
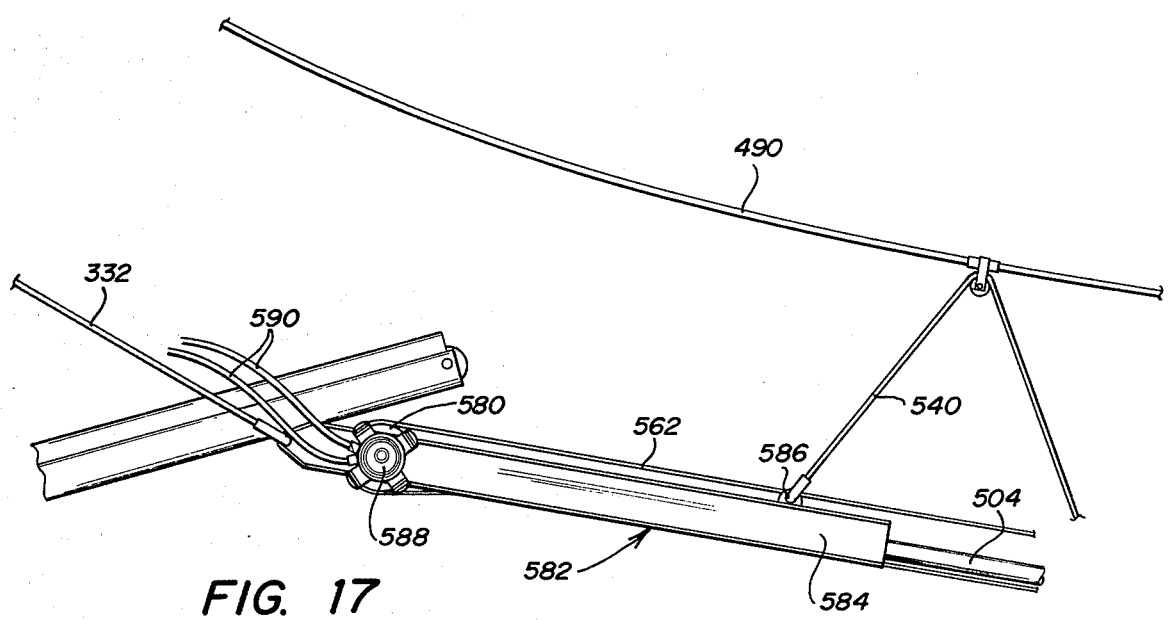
FIG. 17 is an enlarged view of the receiving zone end of the aerial conveyor system illustrated in FIGS. 10a–10c.
Figure 18:
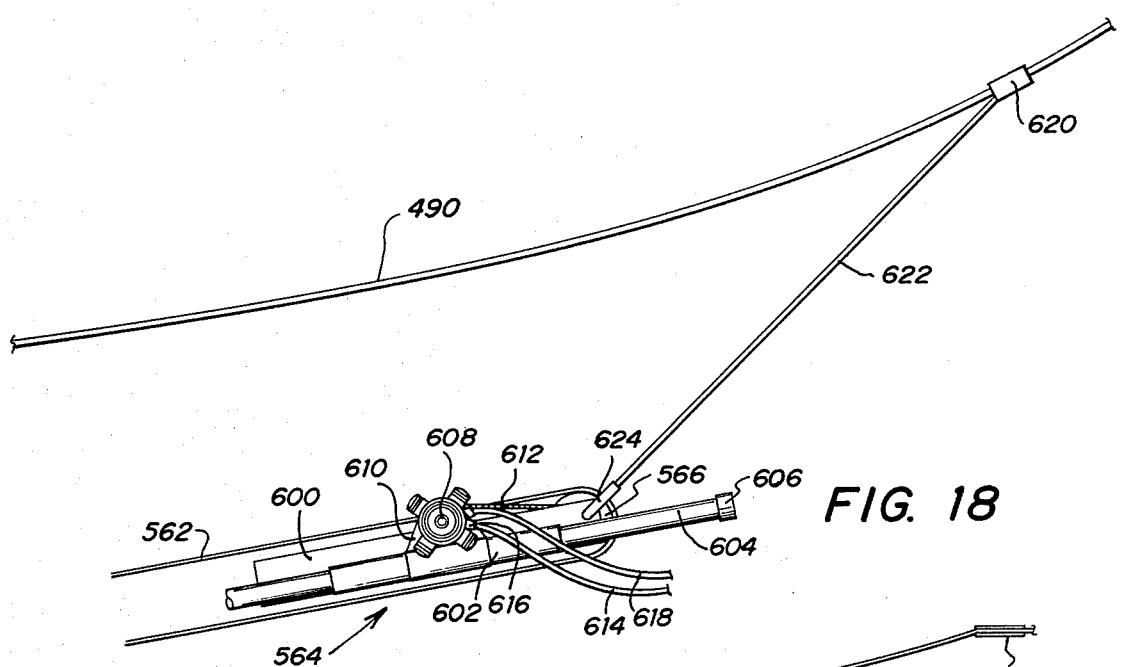
FIG. 18 is an enlarged view of the discharge zone end of the aerial conveyor system illustrated in FIGS. 10a–10c.

The structural details of the receiving zone end and the discharge zone end of aerial conveyor system 250 are illustrated in FIGS. 17 and 18, respectively. Referring first to FIG. 17, frame 582 forming the receiving zone end of conveyor system 250 comprises a pair of beams 584 which extend substantially parallel to belt 562. Beams 584 are adapted with pulleys 586 from which beams 584 are supported from cable 490 by support cables 540 and 542 substantially in the same manner as conveyor support frames 502 are supported from cable 490. In embodiments of the invention in which roller 580 is driven, one or more hydraulic driven motors 588 are supported on beams 584 and are operatively connected to roller 580. Pressurized hydraulic fluid is directed to motors 588 and spent hydraulic fluid is removed therefrom by lines 590 extending from vehicle 252.

Referring now to FIG. 18, frame 564 at the discharge end of the conveyor system 250 includes a pair of beams 600 for rotatably supporting roller 566. A housing 602 is attached to each beam 600 and is adapted to slidably receive a tube 604 therethrough. Tube 604 is an extension of the tubing 504 of the last conveyor belt support frame 502 in the array of support frames. Tube 604 extends through housing 602 and is adapted at its distal end with a stop cap 606. One or more drive motors 608 are supported on frame 564 by means of brackets 610 and are operatively connected to roller 566 by means of a chain and sprocket drive 612. Pressurized hydraulic fluid from lines 614 is directed to hydraulic motor 608 through coupling 616. Spent hydraulic fluid from motor 608 is directed through tubes 618 for suitable discharge (not shown) on vehicle 254.

Beams 600 of frame 564 are secured against movement with respect to cable 490 by means of clamps 620 and tie rods 622 connected thereto and to brackets 624 secured to beams 600. Therefore, tie rods 622 serve to apply the tensioning of cable 490 directly to frame 564 in order to prevent movement thereof relative to cable 490. It will be understood, however, that tube 604 attached to tube 504 of conveyor support frames 502 is free to move relative to frame 564 by sliding within housing 602 attached to beams 600.

Figure 19:
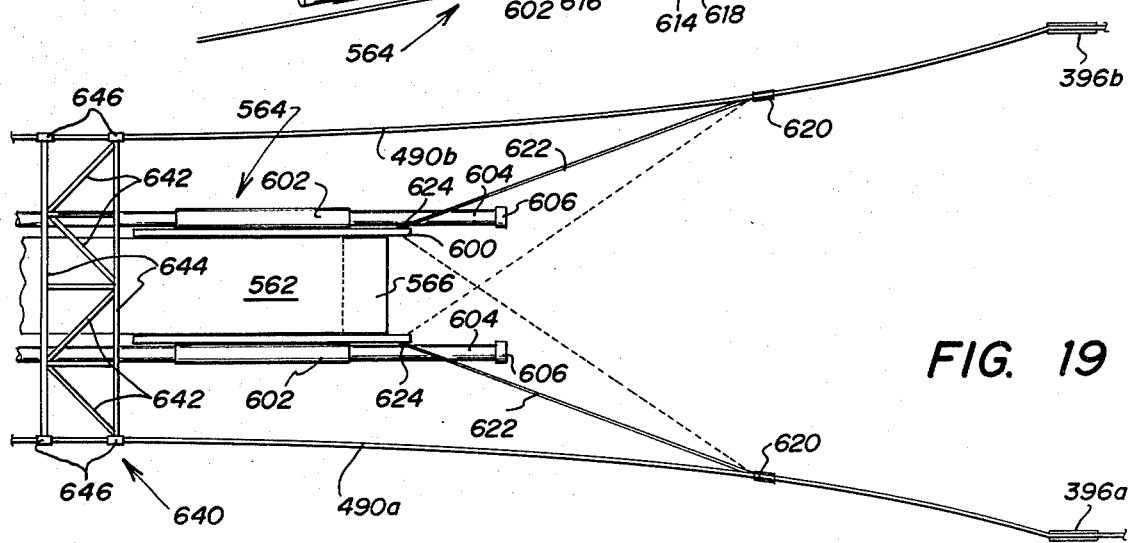
FIG. 19 is a top view of the discharge zone end of the aerial conveyor system taken generally along line 19—19 of FIG. 10c looking in the direction of the arrows.

FIG. 19 illustrates a top view of the conveyor discharge end 262 of conveyor system 250. It may be seen that cables 490a and 490b extend from vehicle 254 over pulleys 369a and 396b to conveyor system 250. For purposes of illustration only, in one embodiment of the present invention, the separation distance between pulleys 396a and 396b is 35 to 40 feet. The cables 490a and 490b extending from vehicle 254 converge from pulleys 396a and 396b and are maintained in a spaced relationship by a rigid tubular structure 640 composed of a lattice arrangement of tube members 642 joining two transverse tube members 644. The rigid tubular structure 640 is attached between cables 490a and 490b by suitable clamps 646. For purposes of example only, with respect to one embodiment of the present invention, the tubular structure 640 is on the order of 5 to 10 feet in length. While not shown, a structure similar to that of tubular structure 640 is positioned at spaced intervals between cables 490a and 490b along the length of the conveyor system 250. In one embodiment of the invention, four such spaced tubular structures 640 are used in a conveyor system spanning the length of approximately 200 to 300 feet.

Referring again to FIG. 19, tie rods 622 extend from clamps 620 on cable 490 and are joined at their opposite ends to frame 564 by brackets 624. Roller 566 is supported between beams 600 of frame 564, and belt 562 is supported for rotation about roller 566. Also shown in FIG. 19 are housings 602 and tubes 604 slidably engaged therethrough.

As is shown in phantom lines in FIG. 19, in one embodiment of the present invention, tie rods 622 are crossed as they extend from cable 490 to beams 600. This arrangement of tie rods 622 has been found to substantially stabilize the entire conveyor system 250 and to significantly resist the tendancy of the conveyor structure to swing laterally under the action of loads on the conveyor system or wind and other weather conditions encountered during operation of the unit.

Figure 20:
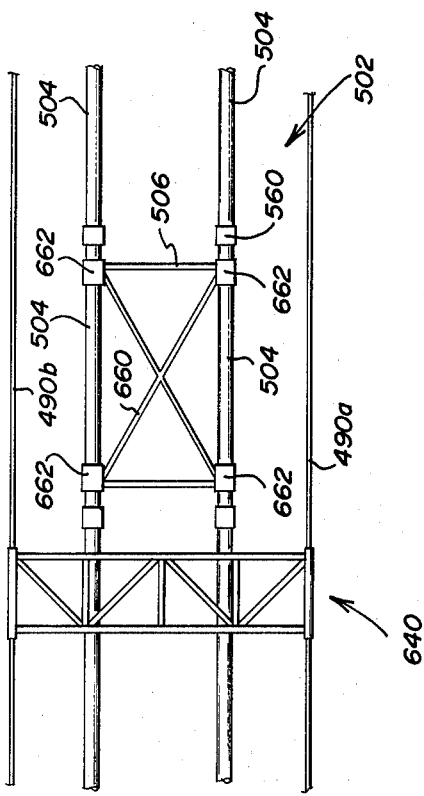
FIG. 20 is a top view of a midsection of the aerial conveyor system taken generally along line 20—20 of FIG. 10b looking in the direction of the arrows.

FIG. 20 illustrates a top view of the aerial conveyor system near the center of the span of the conveyor between vehicles 252 and 254. As is illustrated in FIG. 20, cables 490a and 490b are spaced by the rigid tubular structure 640 as earlier described with respect to FIG. 19. FIG. 20 further illustrates the structure for further supporting the longitudinal tubular members 504 which make up conveyor support frames 502. As previously described, conveyor support frames 502 are interconnected by sleeve couplings 560 which join the ends of tubular members 504 of one frame structure to tubular members in adjacent frame structures. The tubular members are maintained in a spaced parallel relationship to make up the sides of frame 502 by transverse beams 506 which are interconnected between corresponding tube members 504 in the various frame structures. In one embodiment of the invention, cross brace members 660 are interconnected between opposite ends of corresponding tubular members 504 by suitable clamps such as fittings 662. In one embodiment of the invention, cross brace members 660 are used continuously along the length of the conveyor system 250 while in an alternative embodiment of the invention, cross brace members 660 are used only as necessary to add rigidity to the conveyor structure.

In operating the unit, it is necessary to maintain substantial tension on belt 562 to prevent belt slippage when transporting substantial quantities of material on the belt. Alternatively, when conveyor belt 562 is either unloaded or very lightly loaded, excessive tension on the belt tends to cause bending and other possible damage to the conveyor support frames 502. The problem of properly tensioning the conveyor belt for the particular load carried thereon is overcome in the present invention illustrated in FIGS. 10a, 10b and 10c by the control of winch 330 on vehicle 252 and the control of winches 400a and 400b on vehicle 254 to selectively control the tension in cable 490 and in conveyor belt 562. By controlling winches 400a and 400b, the tension experienced in cable 490 may be selectively controlled with the load drawn by winches 400a and 400b being proportionally divided by cable 490 and the conveyor belt structure. By controlling the winch 330 on vehicle 252, the tension on belt 562 may be varied and controlled as desired. Thus, whenever the total load of material being carried by conveyor belt 562 is increased, winch 330 may be actuated to draw in cable 332 and thus increase the tension on belt 562. As has been indicated, frame 564, and drive roller 566 carried thereby, are fixedly attached to tie rods 622 extending from cable 490 and are adapted to slide relative to tubes 604 and conveyor support frame 502 attached to tubes 604. However, the roller 580 which forms the receiving zone end of the conveyor belt is carried by frame 582 which is attached to a conveyor support frame 502 at the receiving zone end of aerial conveyor system 250. Thus, it will be understood that by drawing in cable 332 attached to frame 582, the distance between rollers 580 and 566 is increased as the conveyor support frames move relative to frame 564 supporting drive roller 566. This increase in distance between rollers 580 and 566 increases the tension on belt 562.

Conversely, whenever the total weight of the material carried by conveyor belt 562 is reduced, winch 330 is actuated to let out cable 332 thereby reducing the tension in conveyor belt 562. It will thus be understood that winch 330 functions to regulate the tension in conveyor belt 562 while winches 400a and 400b function to regulate the total tension applied through cable 490 and conveyor belt 562 supported therebelow. The tension in belt 562 is controlled in accordance with the total weight of material carried by the belt, thereby both providing sufficient tension in the belt during the transportation of substantial quantities of material and relieving tension in the belt when unloaded or lightly loaded so as to prevent damage to the conveyor support frame 502.

Various methods for controlling the variation of the tension in conveyor belt 562 are the subject of the present invention and will be discussed hereinafter in greater detail. It will be appreciated, that one of the methods of so varying the tension between the conveyor belt and cable 490 would be the application of the bogie arrangement heretofore discussed with respect to an earlier embodiment of the present invention and discussed in substantial detail with respect to FIG. 4.

Figure 21:
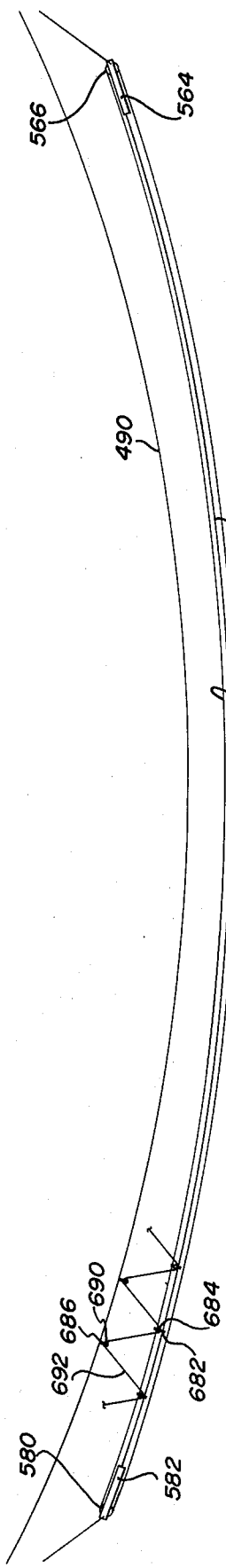
FIG. 21 is an alternative embodiment of the aerial conveyor system illustrated in FIGS. 10a–10c.

It may thus be seen that conveyor belt 562 of the present invention is maintained in its extended position by the application of an axially outwardly directed force supplied by cables 332 attaching the receiving end of the conveyor belt to vehicle 252 and tie rods 622 attaching the discharge end of the conveyor belt to vehicle 254 by way of cable 490. Likewise, conveyor system 250 is axially collapsible inwardly when no outwardly directed axial load is applied to the conveyor belt. Thus, the frame structure supporting the conveyor belt is not the means by which the conveyor belt is extended and thus does not accept any compression loading as in earlier prior art conveyor systems. Because of this unique feature, the tube members 504 of conveyor support frames 502 need not be rigid members. In an alternative embodiment of the invention shown in FIG. 21, the longitudinal support for the conveyor support rollers is provided by continuous cables 680 which extend from frame 564 supporting roller 566 at the discharge end of the conveyor belt to frame 582 for supporting roller 580 at the receiving end of the conveyor belt. As with tubes 504, cables 680 are composed of one portion extending on either side of conveyor belt 562 and is maintained in a spaced apart relationship by a suitable transverse member similar to beam 506 shown in FIG. 16.

The substitution of cables 680 for tubes 504 is made with little modification to the embodiment described with respect to FIGS. 10a, 10b, 10c, 16, 17, 18, 19 and 20. Cables 680 may be readily substituted for the tubes 504 in that tubes 504 do not experience compression loading during the operation of the conveyor system.

Cable 680 is adapted with a plurality of brackets 682 clamped thereto, each supporting a pulley 684. These clamp and pulley combinations are equally positioned along the length of cable 680. Likewise, a plurality of clamps 686 are attached to cable 490 with each supporting a pulley 690 therefrom. Again these clamp and pulley systems are positioned along the length of cable 490 between vehicle 252 and 254. Cable 680, and thus conveyor belt 562, is supported from cable 490 by threading a cable 692 alternately between the pulley systems attached to cable 490 and those attached to cable 680. Thus, it may be seen that the arrangement of supporting the conveyor belt from cable 490 is similar to that described with respect to the embodiment using tube sections instead of cable 680 to make up the conveyor support frames. A primary advantage in the substitution of a cable for the tube sections is that the conveyor system is more easily collapsible for manuvering purposes when the system is not in use for carrying material thereon. Likewise, the substitution makes possible a weight savings in the overall conveyor system.

Figure 22:
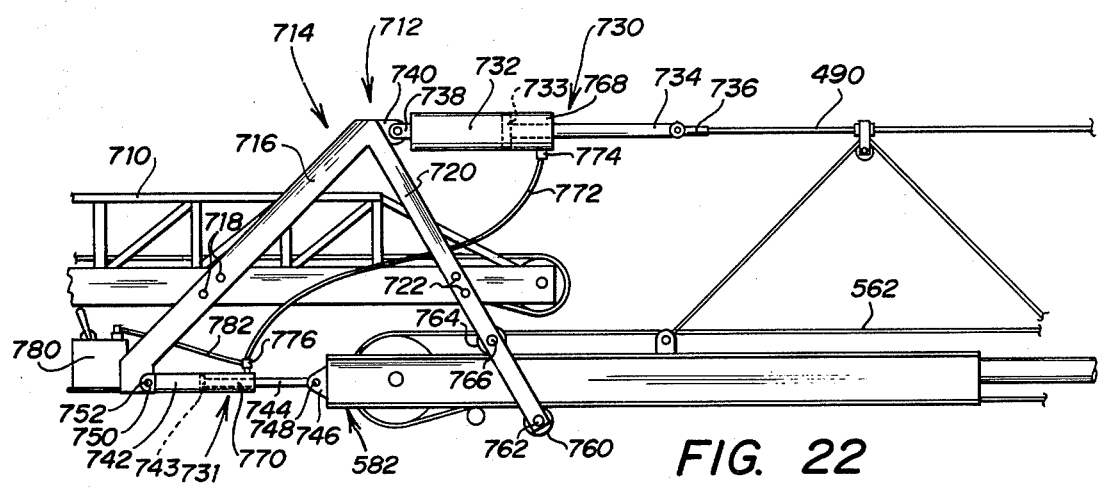
FIGS. 22–26 are plan views of the receiving zone end of an aerial conveyor system embodying the present invention showing alternatives for varying the tension on the conveyor belt.

FIG. 22 illustrates an alternative embodiment of structure at the receiving zone end of aerial conveyor 250 for varying the load carried by conveyor belt 562 and cable 490 in relation to the load applied to belt 562 by the material carried thereon. While FIG. 22 illustrates the apparatus for varying the load carried between belt 562 and cable 490 as supported from a stinger conveyor 710, this structure may likewise be supported from vehicle 252 by way of struts 310 and 312 with cable 490 extending from pulley system 314 attached thereto and by way of cable 332 extending from vehicle 252 about pulley system 316.

FIG. 22 illustrates a support mechanism 712 adapted to support the aerial conveyor system 250 from a stinger conveyor 710 attached to vehicle 252. Support mechanism 712 includes an A-frame 714 having an arm 716 rigidly joined to conveyor 710 by suitable fasteners 718. A-frame 714 further consists of an arm 720 rigidly attached at its upper end to arm 716 and attached to conveyor 710 by suitable fasteners 722. In this embodiment of the invention, the aerial conveyor system 250 is attached to A-frame 714 by hydraulic cylinders 730 and 731. Hydraulic cylinders 730 consist of a cylinder housing 732, a piston 733 and piston shaft 734. The end of piston shaft 734 remote from cylinder housing 732 is adapted with a coupling 736 for attachment to cable 490. Cylinder housing 732 of hydraulic cylinder 730 is adapted with a coupling 738 for connection to lug 740 extending from the apex of A-frame 714.

Hydraulic cylinder 730 likewise includes a cylinder housing 742, a piston 743 and a piston arm 744 attached to piston 743. Piston arm 744 is attached to frame 582 at lug 746 extending from the end of frame 582. The connection between piston 744 and lug 746 is by a suitable pin 748 which permits rotation between cylinder 730 and frame 582. Cylinder housing 742 is adapted with a lug 750 on the end thereof for connection by way of pin 752 to the lower end of arm 716 of frame 714.

A roller 760 is rotatably attached by axis shaft 762 at the lower end of arm 720. Intermediate of roller 760 and the point of connection of arms 716 and 720 is a second roller 764 attached thereto by axis shaft 766. Thus, frame 582 is supported by arm 720 on roller 760. However, frame 582 is capable of sliding relative to arm 720 by rolling between rollers 760 and 764.

The chambers 768 formed between piston 733 and the end of cylinder housing 732 remote from the attachment of cylinder housing 732 to frame 714 and chamber 770 existing between piston 743 and the end of cylinder housing 742 are interconnected by pressure line 772 at couplings 774 and 776. Oil reserve container 780 is connected by line 782 to coupling 776 on line 772 for supplying oil to the cylinders.

In operation of the embodiment described in FIG. 22, oil is loaded from oil container 780 through line 782 into line 772. In this way, oil is loaded simultaneously into chambers 768 and 770 of cylinders 730 and 731, respectively. As oil is loaded into chambers 768 and 770, piston shafts 734 and 744 will be retracted into cylinders 730 and 731 thereby generating a tension load in both cable 490 and belt 562. Oil is loaded into the chamber until a desired combined load is exerted on cable 490 and belt 562. Because fluid chambers 768 and 770 are interconnected by pressure line 772, the pressure within these chambers will always be the same. Thus, the load resisted by the fluid in chambers 768 and 770 will be directly proportional to the area of piston 733 and 743. The cylinder size is selected to proportionally distribute the load of the aerial conveyor system between cable 490 and conveyor belt 562 as desired. For example, if the piston area of piston 733 of cylinders 730 is four times the piston area of piston 733 of cylinder 731, the load resisted by cylinder 730 and thus experienced in cable 490 will be four times as great as the load resisted by cylinder 731 and thus the load exerted on conveyor belt 562.

It will be noticed that cylinder 731 is disproportionally longer than hydraulic cylinder 730. In this way, more travel is provided for cylinder 731 than would ever be required under a full pressure loss configuration. In cases of loss of fluid pressure from the system, conveyor belt 562 and its supporting structure would be allowed to sag until cable 490 accepted the full load of the aerial conveyor system. In this way, the conveyor belt cannot be over stressed in a fluid pressure loss condition, thus preventing costly damage to the system.

Figure 23:
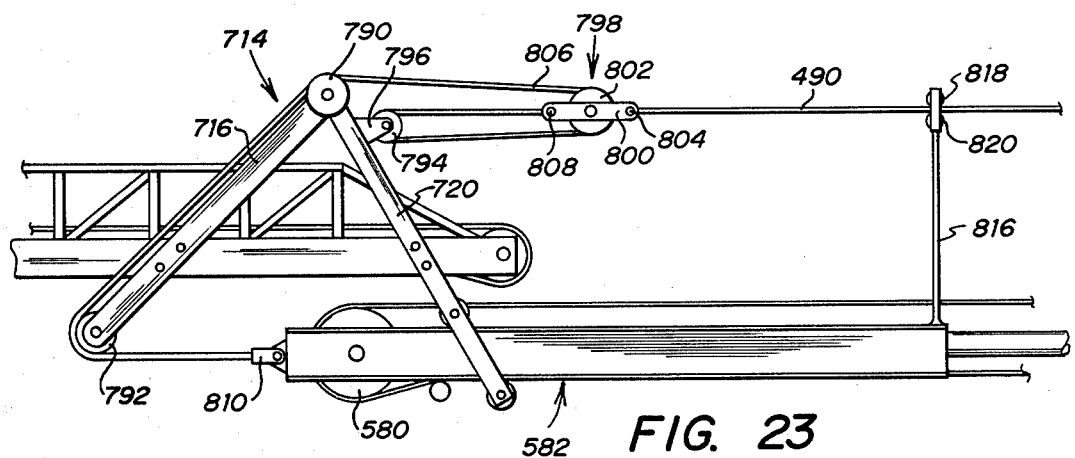
Figure 24:
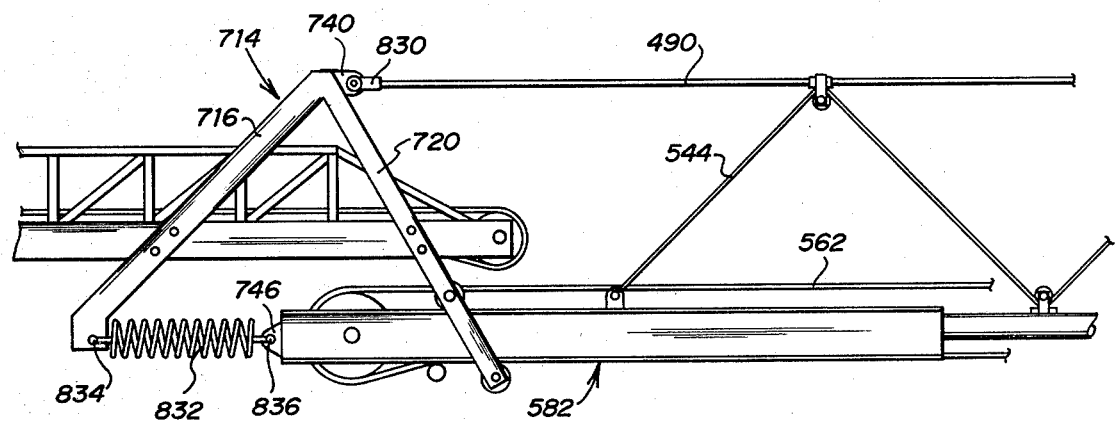
Figure 25:
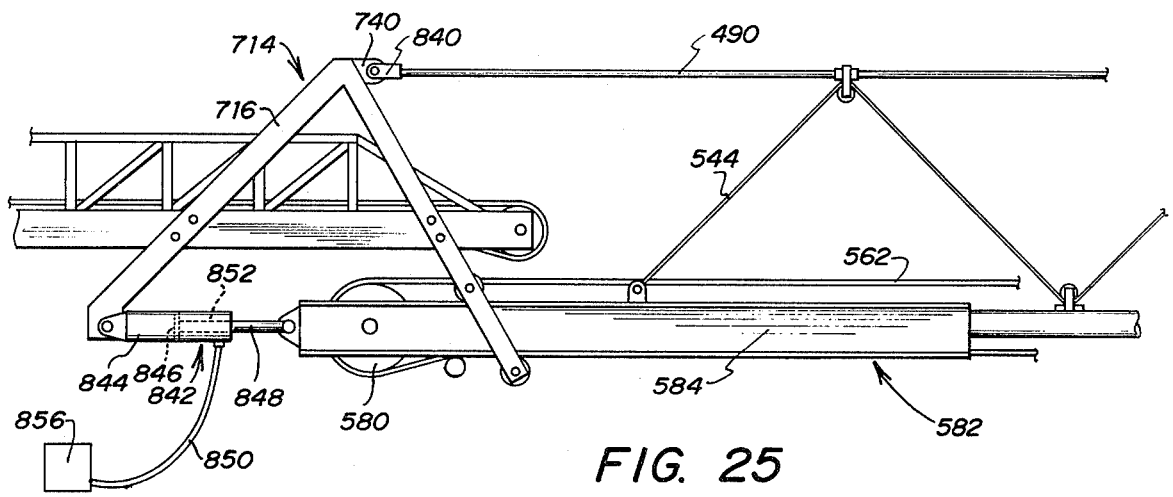

FIGS. 23, 24 and 25 illustrate alternative methods for varying the tension between conveyor belt 562 and cable 490 from which the conveyor belt is supported. In FIG. 23, A-frame 714 is adapted with a pulley 790 at the apex of arms 716 and 720. Frame 714 is similarly fitted with a pulley 792 fixed to the lower end of arm 716. A third pulley 794 is supported from a bracket 796 attached to arm 720 of frame 714 and in line with cable 490. A block and tackle 798 is appropriately attached to the end of cable 490. Block and tackle 798 consists of a bar 800 with a pulley 802 rotatably attached thereto. One end of bar 800 is fixedly pinned to cable 490 by suitable fastener 804. A cable 806 is attached to the opposite end of bar 800 by suitable fastener 808 and entrained about pulley 794, pulley 802, pulley 790 and pulley 792. The end of cable 806 remote from the end attached to bar 800 is attached by coupling 810 to frame 582.

Thus, it is seen that frame 582 and cable 490 are interconnected by way of cable 806. However, because of the pulley arrangement and number of wraps of cable 806 between frame 714 and cable 490, the load exerted on frame 582, and thus conveyor belt 562, is only a fraction of that which will be applied to cable 490. For example, where the load exerted on cable 490 is 60,000 pounds, the load exerted on frame 582 by cable 806 to counterbalance the load in cable 490 will be one-third that amount or 20,000 pounds. It will be apparent to those skilled in the art by varying the number of wraps of cable 806 between frame 714 and cable 490 the proportional loading between cable 490 and conveyor belt 562 may be varied as desired.

Thus, the arrangement of FIG. 23 for interconnecting conveyor belt 562 and cable 490 permits a larger proportion of load to be carried by cable 490. Therefore, as more material is loaded onto conveyor belt 562, this load exerted through cable 806 is transmitted to cable 490 in proportion to the number of wraps of cable 806 between frame 714 and cable 490.

Also illustrated in FIG. 23 is alternative structure for supporting frame 582 from cable 490. This structure includes a support rod 816 fixedly attached to the end of frame 582 remote from roller 580 and extending upwardly to support a pair of rollers 818 and 820 at the upper end thereof. Rollers 818 and 820 are adapted to ride above and below, respectively, of cable 490 thereby supporting frame 582 from cable 490 while allowing translation of cable 490 relative to frame 582.

FIG. 24 illustrates another alternative arrangement whereby cable 490 is fixedly attached by coupling 830 to lug 740 on frame 714. Frame 582 is attached to the lower end of arm 716 of frame 714 by way of tension spring 832 which is connected through an aperture 834 in arm 716 and through an aperture 836 in lug 746 extending from frame 582. Thus, loading introduced on conveyor belt 562 results in the extension of tension spring 832. Because cables 490 are fixedly attached to frame 714, the extension of spring 832 permits additional loading to be carried by cable 544 from the conveyor support frames to cable 490 thus increasing the portion of the total load carried by cables 490.

FIG. 25 shows another alternative embodiment for varying the loading between cable 490 and conveyor belt 562. In this embodiment, cable 490 is again fixedly attached by coupling 840 to lug 740 on frame 714. Frame 582 is attached to arm 716 of frame 714 by a hydraulic cylinder 842. Cylinder 842 consists of a housing 844, a piston 846 and a piston ram 848 attached to piston 846. A line 850 is connected to the chamber 852 formed between piston 846 and the end of housing 844 and supplies oil within the chamber in proportion to the loading on the conveyor belt 562. The servo mechanism 856 for supplying fluid into cylinder 842 in proportion to the loading on belt 562 will be described hereinafter in greater detail. In operation, fluid is loaded into cylinder 842 as loading on belt 562 increases thereby causing the retraction of piston 848 and the tensioning of belt 562. As the load on belt 562 is reduced, fluid is permitted to flow from cylinder 842 and tension on the belt is correspondingly reduced.

Figure 26:
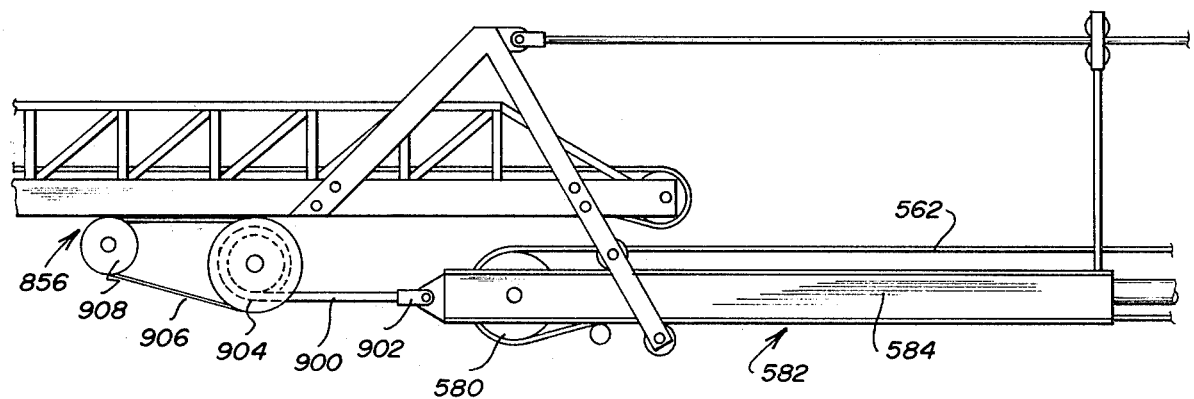

FIG. 26 shows another system for tensioning the conveyor belt 562 as the loading on the belt increases. The system includes a cable 900 attached to frame 582 by coupling 902 and attached at its opposite end to a takeup reel 904. Reel 904 is adapted to receive a drive chain 906 which is driven by motor 908. Motor 908 is controlled by an appropriate servo mechanism, described hereinafter in detail, which is actuated in response to the power required to drive belt 562. Thus, where the motor for driving drum 580 is electrically powered, the servo mechanism functions to monitor the amperage being drawn by the drive motor and actuates the motor to drive chain 906 to wind in cable 900 on reel 904 in order to tension belt 562. Thus, when belt 562 is subjected to higher loadings, the amperage being drawn by the drive motor will increase proportionally thereto. In turn, this amperage actuates the servo mechanism to energize motor 908 to draw in cable 900 thereby tensioning belt 562 in the high loading mode. Likewise, when loading on belt 562 is reduced, the servo mechanism monitors the amperage being drawn by the drive motor and relieves the tension on cable 900 by reducing the torque being produced by motor 908 and therefore the torque transmitted to takeup reel 904 through drive chain 906. In this way, the tension on belt 562 is reduced in proportion to the reduction of load on the belt.

Figure 27:
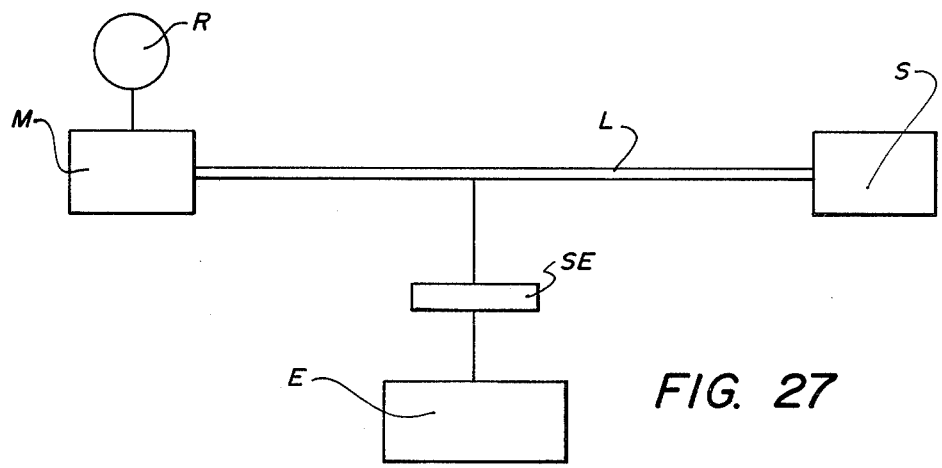
FIG. 27 is a schematic diagram of a system for varying the tension on the conveyor belt in accordance with the loading on the conveyor belt.

FIG. 27 is a schematic diagram of the servo mechanism used to supply hydraulic fluid to cylinder 842 of the system illustrated in FIG. 25 and to drive the tensioning system illustrated in FIG. 26. The diagram illustrates a motor M for driving the roller R at the receiving zone end of the aerial conveyor system. Motor M is driven by a hydraulic fluid supply S normally carried on vehicle 252. The hydraulic fluid is directed from supply S to motor M by fluid pressure line L. A sensor SE is connected to line L to monitor the pressure existing therein. Sensor SE simultaneously controls electric motor E which supplies fluid to cylinder 842 of FIG. 25 or drives takeup reel 904 illustrated in FIG. 26. Sensor SE functions to increase the torque output of electric motor E in direct relation to the increase in hydraulic fluid pressure in line L. Likewise, a reduction in pressure in line L results in a decrease in torque power developed by electric motor E due to the control of sensor SE, thereby proportionally supplying hydraulic fluid for the system of FIG. 25 or driving takeup reel in the system of FIG. 26.

Figure 28:
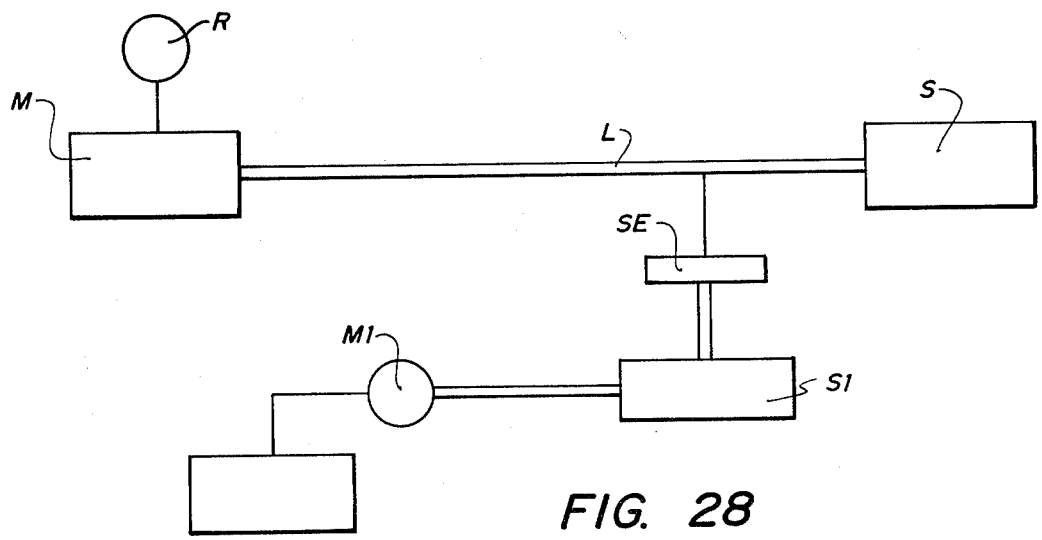
FIG. 28 is a schematic diagram of an alternative system for controlling the tension on the conveyor belt in accordance with the loading on the conveyor belt.

FIG. 28 illustrates a similar servo mechanism used to supply hydraulic fluid in the takeup systems of FIG. 25 or FIG. 26. In this servo mechanism, sensor SE controls pressure delivered from hydraulic fluid supply S1 which supplies hydraulic fluid to cylinder 856 of the system of FIG. 25 or to a hydraulic motor 907 for driving takeup reel 904. As with the servo mechanism illustrated in FIG. 27, an increase in fluid pressure line L is sensed by sensor SE an controls the hydraulic fluid delivered to M1, the fluid pressure being increased to M1 when the hydraulic fluid pressure in line L is increased. Thus, when the conveyor belt in the aerial conveyor system is highly loaded, and motor M is drawing a larger pressure through line L, a larger pressure will be delivered to M1 to actuate cylinder 842 of the system of FIG. 25 or to drive motor 908 to rotate reel 904 thereby increasing the tension on the conveyor belt. Similarly, the tension is relieved when the load on the belt is reduced.

Figure 29:
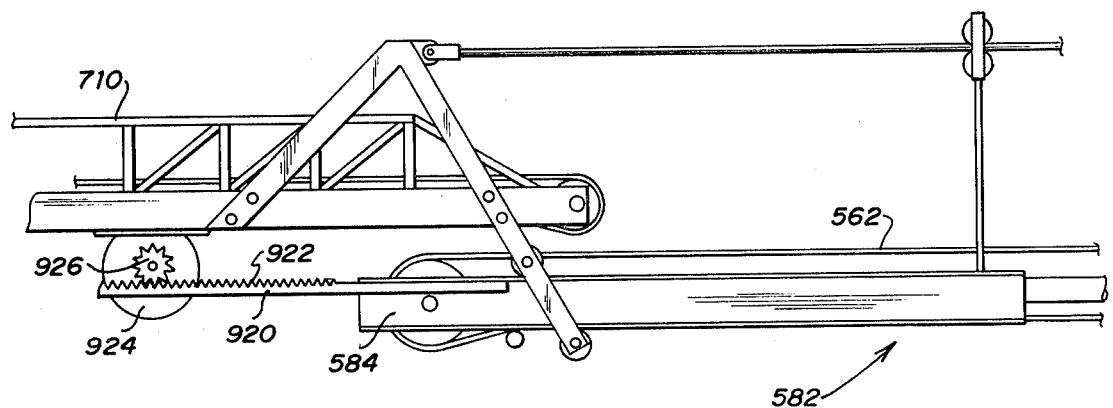
FIG. 29 is a plan view of the receiving zone end of an aerial conveyor system embodying the present invention illustrating an alternative embodiment for varying the tension on the conveyor belt.

FIG. 29 shows an alternative means for increasing and decreasing the tension in belt 562 in accordance with the loading experienced by the belt. In the embodiment illustrated in FIG. 29, frame 582 is adapted with a rack 920 which extends longitudinally from frame 582. Rack 920 is adapted with a plurality of teeth 922 extending along the upper surface thereof. A motor 924 is attached to stinger conveyor 710 and is adapted with a pinion gear 926 which mates with teeth 922 or rack 920. Motor 924 is likewise controlled by servo mechanism described with respect to the arrangement in FIGS. 25 and 26 and illustrated in FIGS. 27 and 28. Thus, when loading on belt 562 is increased, the servo mechanism proportionally increases the torquing force of motor 924 to ride up rack 920 thereby drawing frame 582 toward motor 924. The torque produced by motor 924 is in direct proportion to the loading on belt 562. In this way, the tension introduced on belt 562 is directly proportional to the loading existing thereon. Motor 924 may be powered by hydraulic fluid or electrically powered. Where electrically powered, the servo mechanism described in FIG. 27 may be adapted for controlling the torque output of the motor. Where hydraulically powered, the servo mechanism described in FIG. 28 may be employed.

Figure 30:
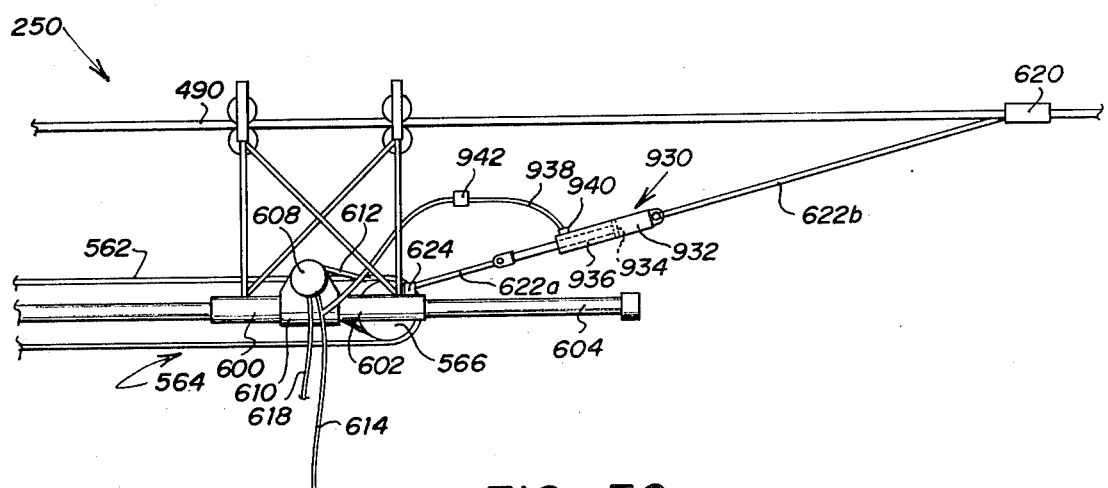
FIGS. 30–31 are plan views of the discharge zone end of an aerial conveyor system embodying the present invention showing alternatives for varying the tension on the conveyor belt.

FIG. 30 illustrates the discharge end of the aerial conveyor system 250 and an alternative embodiment for monitoring the load on conveyor belt 562 and for adjusting the tension on the conveyor belt in accordance with changing loads thereon. In the embodiment illustrated in FIG. 30, the discharge end of the conveyor is identical to that described with respect to FIG. 19 in that beams 600 of frame 504 are supported from cables 490 and are adapted with housings 602 for slidably receiving tubes 604 therethrough. Tubes 604 are extensions of the tubes 504 of the last conveyor support frame 502 in the array of support frames. One or more drive motors 608 are supported on frame 504 by brackets 610 and are operatively connected to roller 566 by means of chain and sprocket drive 612. Pressurized hydraulic fluid from lines 614 are directed to drive motor 608 and spend hydraulic fluid from motor 608 is directed through lines 618 for suitable discharge (not shown) on vehicle 254.

Frame 564 is further secured with respect to cables 490 by means of clamps 620 and tie rods 622 connected thereto and extending to brackets 624 on frame 564. In the embodiment illustrated in FIG. 30, each tie rod 622 consists of two portions 622a and 622b interconnected by hydraulic cylinder 930. Hydraulic cylinder 930 includes a cylinder portion 932, a piston 934 and a piston shaft 936. A fluid pressure line 938 is connected into cylinder portion 932 at coupling 940 such that fluid pressure may be communicated into the annular chamber formed between piston 934 and the end of cylinder portion 932. Fluid pressure line 938 is connected at its end remote from cylinder 930 to fluid pressure line 614. Thus, as increased fluid pressure is delivered to motor 608 through fluid pressure line 614, as when conveyor belt 562 is in a high load configuration, this pressure is communicated by way of fluid pressure line 938 to cylinder 930. The increase in pressure results in the retraction of piston shaft 936 thereby drawing frame 564 along tube 604 to apply added tension to conveyor belt 562. Likewise, as fluid pressure in line 614 is reduced, as where the load on motor 608 is reduced due to lighter loading on conveyor belt 562, this reduction in hydraulic pressure is conveyed to cylinder 930 by way of hydraulic pressure in line 938 thereby allowing the extension of piston shaft 936 to relieve the tension on conveyor belt 562.

Where motor 608 is an electric motor, pressure line 938 is connected to an oil reservoir 608a attached to frame 564. Reservoir 608a is adapted with a monitoring device responsive to the amperage being drawn by electric motor 608. The monitoring device of reservoir 608a functions to increase the fluid pressure in line 938 in proportion to the increase in amperage drawn by motor 608. Likewise, pressure is decreased in line 938 and thus in hydraulic cylinder 930 when the amperage being drawn by motor 608 decreases. It is well known in the art that as the load on motor 608 varies, the amperage drawn by the electric motor varies in a direct proportion thereto. Thus, when belt 562 is highly loaded resulting in an increase in load on motor 608, the amperage drawn by motor 608 will increase proportionally. Thus, an increase in loading on belt 562 will result in increased pressure delivered by reservoir 608a to hydraulic cylinder 930 and a corresponding retraction of piston 934 and piston shaft 936 to draw in frame 564 thereby tensioning belt 562. Corresponding with a decrease in load on belt 562, the pressure supplied to hydraulic cylinder 930 will be decreased and the tension on belt 562 will be reduced proportionally.

In both embodiments, where motor 608 is either hydraulic or electric, a needle valve 942 is connected between hydraulic cylinder 930 and the source of hydraulic fluid thereto. The needle valve serves to constrict the flow of fluid pressure into hydraulic cylinder 930 to prevent startup impulse forces from damaging the system. Thus, the high pressure which will correspond to the high amperage drawn by the electric motor at startup will not be felt by hydraulic cylinder 930. Rather, valve 942 is adapted to constrict the flow of fluids into cylinder 930 such that initial startup pressures are not felt by the system. Valve 942 is further designed such that motor 608 reaches its steady state operation prior to full loading of cylinder 930.

Figure 31:
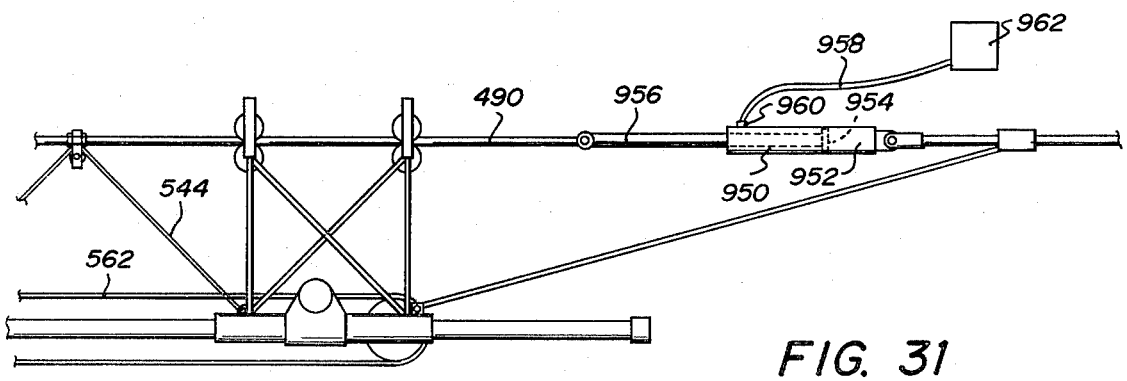

FIG. 31 illustrates an alternative arrangement to that shown in FIG. 30 in that a hydraulic cylinder 950 is interconnected along cable 490. Hydraulic cylinder 950 includes a cylinder housing 952, and a piston 954 connected to a piston shaft 956. A hydraulic line 958 is interconnected to piston housing 952 by coupling 960. Hydraulic line 958 is connected at its opposite end to an adjustable fluid pressure source 962. In this embodiment of the invention, fluid pressure is loaded from fluid pressure source 962 into cylinder 950 to retract shaft 956 until desired tension is drawn on the cable 490. Fluid pressure soucre 962 is adapted to maintain the particular pounds per square inch of pressure in cylinder 950 in order to maintain the tension in cable 490 at a preselected constant value. In this way, as conveyor belt 562 is loaded, additional loading is not accepted by cable 490 through support cables 540, 542, 544 or 546 but rather maintained at a constant value by the action of hydraulic cylinder 950 drawing in or letting out cable 490. In this way, as the loading on belt 562 increases, cable 490 is permitted to sag thereby increasing the tension on conveyor belt 562.

Figure 32:
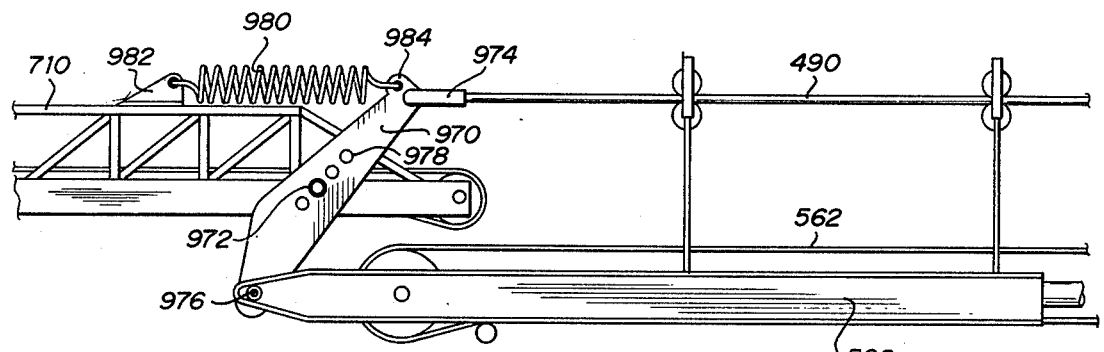
FIGS. 32-34 are plan views of the receiving zone end of an aerial conveyor system embodying the present invention illustrating alternatives for controlling the tension on the conveyor belt.
Figure 33:
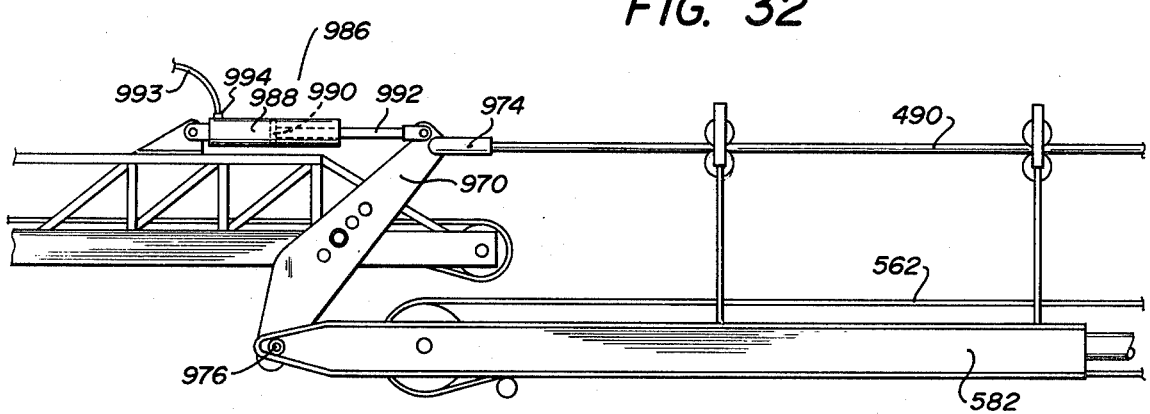
Figure 34:
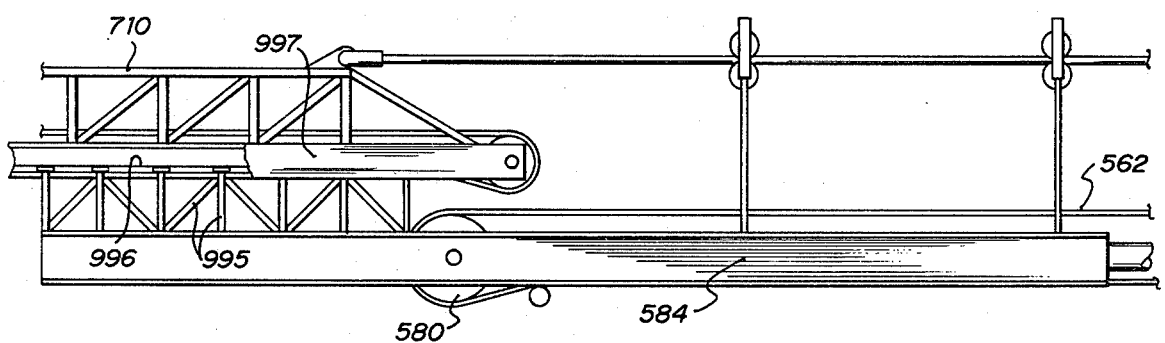

FIGS. 32, 33 and 34 disclose alternative embodiments of structure located at the material receiving end of the aerial conveyor system for varying the tension between cable 490 and conveyor belt 562. In FIGS. 32 and 33, frame 582 and cable 490 are attached to opposite ends of a bogie 970 pivotally attached to stinger conveyor 710 at axis shaft 972. Cable 490 is attached to the upper end of bogie 970 by clamps 974, and frame 582 is attached to the lower end of bogie 970 by a suitable pin, such as fastener 976. The point of pivotal connection of bogie 970 to stinger 710 is adjustable by pinning bogie 970 at various apertures 978 so as to vary the mechanical advantage of the bogie.

In the embodiment illustrated in FIG. 32, a tension spring 980 is attached between bracket 982 on stinger conveyor 710 and lug 984 attached to the upper end of bogie 970. The effect of tension spring 980 is to increase tension on cable 490 thereby relieving tension on conveyor belt 562.

Referring to FIG. 33, hydraulic cylinder 986 is substituted for spring 980 illustrated in FIG. 32. Hydraulic cylinder 986 consists of the cylinder housing 988, a piston 990 and a piston shaft 992. A hydraulic line 993 is connected to housing 988 at coupling 994. Hydraulic line 993 is attached to housing 988 at the end of hydraulic cylinder 986 adjacent its connection to stinger conveyor 710. In this way, the introduction of hydraulic fluid into cylinder 986 tends to force hydraulic piston shaft 992 out of cylinder housing 988 thus rotating bogie 970 to tension conveyor belt 562. Hydraulic line 993 is connected to the hydraulic source used to drive the hydraulic motors propelling conveyor belt 562 (not shown). Thus, an increase in hydraulic pressure to these motors in conjunction with increased loading on conveyor belt 562 will result in increased hydraulic pressure in hydraulic cylinder 986 and the resultant extension of shaft 992. This extension of shaft 992 in turn rotates bogie 970 about axis shaft 972 to tension conveyor belt 562. Likewise, a reduction of pressure to the motors driving belt 562 as where the load on belt 562 will result in a reduced pressure in hydraulic cylinder 986 and the resultant retraction shaft 992 and the reduction of tension on belt 562. Thus, the structure illustrated in FIG. 33 will tend to increase the tension on belt 562 at times of high loading on the belt and will reduce tension on the belt when the belt is lightly loaded. Where an electric motor is used, the operation of hydraulic cylinder is controlled by monitoring the amperage drawn by the motor as discussed earlier with respect to FIG. 30.

FIG. 34 illustrates an embodiment in which frame 584 extends beyond roller 580 and is adjustably engaged directly to stinger conveyor 710. Attachment is made by a lattice structure 995 extending between frame 584 and a pair of rods 996 which are slidably received in frame 997 of stinger conveyor 710. This connection therefore permits frame 584 to move relative to conveyor 710 thus permitting tensioning of belt 562 in response to the loads thereon as hereinabove discussed.

Figure 35:
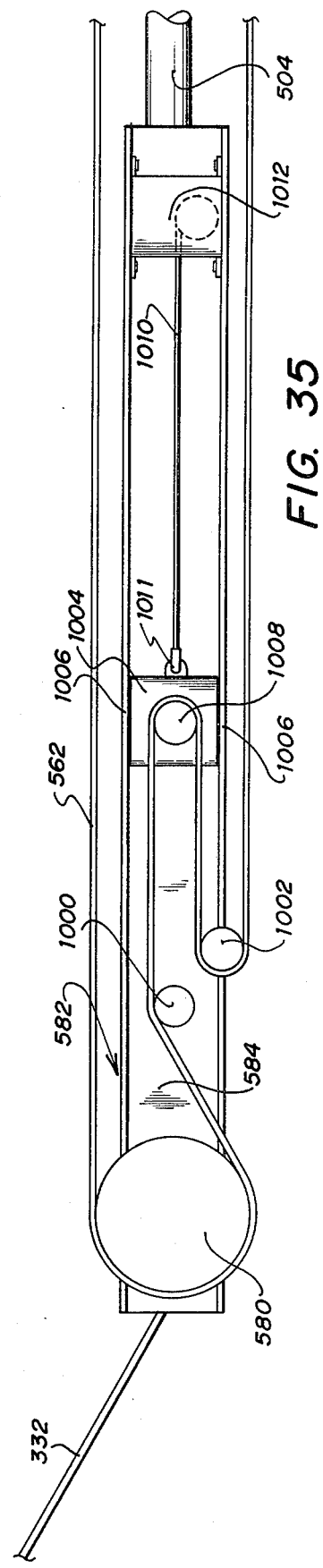
FIG. 35 is a vertical section view taken through the receiving zone end of the aerial conveyor system showing a takeup mechanism for controlling the tension on the conveyor belt while permitting relative movement between the receiving and discharge zone ends of the conveyor system.

FIG. 35 illustrates an alternative embodiment of the aerial conveyor system wherein the conveyor belt 562 is extendable to permit the extension and retraction of the receiving zone end of the system relative to the discharge zone end as the conveyor system is moved from one operating location to another. In the embodiment illustrated in FIG. 35, receiving zone roller 580 is supported within frame 582 which is attached at one end to cables 332 extending from vehicle 252 (FIG. 10a). Frame 582 forming the receiving zone end of the conveyor system 250 comprises a pair of beams 584 which extend substantially parallel to belt 562. Beams 584 are positioned on each side of roller 580 and receive roller 580 for rotation therebetween. The ends of beams 584 remote from roller 580 are attached to tubing 504 of the first conveyor support frame 502 in the array making up the conveyor support frame structure.

In the embodiment illustrated in FIG. 35, idle rollers 1000 and 1002 are supported transversely between beams 584. A pair of slide plates are engaged on the inner faces of beams 584 and slide freely within brackets 1006 attached to the inner face of beams 584. An idle roller 1008 is positioned between slide plates 1004 and parallel to rollers 1000 and 1002. A cable 1010 is attached to slide plates 1004 at fittings 1011. The cable extends longitudinally along the tube members 584 and is attached to a takeup apparatus 1012 fixedly attached to the ends of beams 584 remote from roller 580. As is illustrated in FIG. 35, belt 562 is entrained around roller 580 and passes over and around rollers 1000, 1008, 1002 and thereafter to the discharge zone end of the conveyor system. Takeup apparatus 1012 functions to normally draw in cable 1010 thereby drawing in roller 1008 to lengthen the course of conveyor belt 562 between rollers 1000, 1008 and 1002 and thereby apply tension to the belt.

Takeup apparatus 1012 may be set to apply a constant tension force to belt 562 or may be controllable to provide the desired tension for the particular excavating operation. It will be noticed that as vehicle 252 at the receiving zone end of the system moves away from vehicle 254 at the discharge zone end, roller 580 moves away from the discharge zone end of the conveyor system thereby increasing the tension on belt 562. As the tension on belt 562 increases beyond the maximum tension value set in takeup apparatus 1012, cable 1010 will be let out to permit axial movement of roller 1008 thereby permitting an increase in distance between the receiving and discharge zone end of the conveyor system while maintaining the selective tension on belt 562. Thus, the embodiment of the invention illustrated in FIG. 35 provides a system for permitting variance of the distance between the receiving and discharge zone ends of the conveyor system while providing the capability for maintaining tension on the belt throughout the relative movement of the ends.

From the foregoing, it will be understood that the use of the present invention results in numerous advantages over the prior art. Thus, by means of the invention overburden excavated to provide access to an ore-bearing layer is utilized in refilling previously mined portions of the excavation. This is accomplished by means of an economical and highly maneuverable aerial conveyor system, thereby eliminating problems encountered both in the use of prior art conveyor systems and in the use of dump trucks or other vehicles for conveying excavated overburden to the refilling location.

The conveyor system includes structure which is inwardly collapsible and is maintained in the extended position from the receiving zone end to the discharge zone end by applying an axially outwardly directed force on the ends of the conveyor system. The axially outwardly directed force on the conveyor system is directed through cables extending from the receiving zone to the discharge zone and through the conveyor belt supported therebelow. The tension on the conveyor belt is controlled in relation to the load being carried on the conveyor belt. Tension on the conveyor belt is increased as the loading on the belt increases and reduced as the load on the conveyor belt is lightened, thus maintaining the proper tension on the belt throughout the operation of the conveyor system.

Although particular embodiments of the invention have been illustrated in the accompanying drawings and described in the foregoing detailed description, it will be understood that the invention is not limited to the embodiments disclosed, but is capable of numerous rearrangements, modifications, and substitutions of parts and elements without departing from the spirit of the invention.

What is claimed is:

1. An aerial conveyor system, comprising:
   a first cable extending from one end at a material receiving zone over an open area to another end at a material discharge zone;
   a plurality of conveyor belt support rollers each positioned below and transverse to the first cable, said conveyor belt support rollers defining a course between the material receiving and discharge zones;
   an endless conveyor belt supported substantially parallel to and beneath the first cable for movement around the course defined by the conveyor support rollers;
   means for maintaining a predetermined minimum tension in the first cable;
   means for mounting said support rollers in spaced apart relationship with at least one of the endmost support rollers being movable relative to the other endmost roller in the direction of conveyance for tensioning the conveyor belt;
   means for adjustably supporting the conveyor belt support rollers from the first cable such that the support rollers may be raised and lowered relative to the first cable;
   means for applying axially outwardly directed forces to opposite ends of the mounting means to urge the endmost rollers apart from each other; and
   drive means including one of the endmost conveyor support rollers for driving the conveyor belt around the course.

2. The aerial conveyor of claim 1 wherein the means for mounting the conveyor support rollers comprises:
   a pair of elongate members extending substantially parallel to the cable from the receiving zone to the discharge zone and connected to the conveyor belt support rollers.

3. The aerial conveyor of claim 2 wherein the means for applying axially outwardly directed forces to opposite ends of the mounting means comprises:
   a first vehicle coupled to one end of the elongate members;
   a second vehicle positioned at the opposite end of the elongate members;
   a winch supported from the second vehicle;
   a tensioning cable extending from the winch to the end of the elongate member opposite the first vehicle; and
   actuation means associated with the winch for drawing in the tensioning cable to tension the conveyor belt.

4. The aerial conveyor system of claim 2 wherein the elongate members are characterized by an array of tube members, the tube members being engaged end to end with means for permitting axial movement of the receiving zone end of the conveyor belt relative to the discharge zone end of the conveyor belt thereby permitting tensioning of the belt.

5. The aerial conveyor system of claim 2 wherein the means for adjustably supporting the elongate members from the first cable comprises:

second cables connected between the elongate members and the first cable for supporting the elongate members from the first cable, the second cables being adjustable such that the conveyor support rollers may be raised and lowered relative to the first cable by adjusting the length of the second cables.

6. The aerial conveyor system of claim 5 further comprising:

a plurality of spaced first pulleys connected to the first cable; and a plurality of spaced record pulleys connected to the elongate members with the second cables threaded alternately between the pulleys of the first cable and the first and second pulleys are suspended from the first cable.

7. An aerial conveyor system, comprising:

a first cable extending from a material receiving zone over an open area to a material discharge zone;

means for supporting one end of the first cable at the material receiving zone;

means for supporting the other end of the first cable at the material discharge zone;

a plurality of conveyor support frames each comprising a pair of elongate members extending substantially parallel to the first cable and a plurality of transverse support rollers carried between the elongate members, said support frames being arranged end-to-end in an array extending from the receiving zone across the open area to the discharge zone;

means for mounting at least one of the endmost support rollers for movement relative to the elongate members for tensioning the conveyor belt;

a plurality of first pulleys connected at spaced intervals along the first cable;

a plurality of second pulleys connected at spaced intervals along the array of conveyor support frames;

a second cable secured at one end to one of the conveyor support frames and extending alternately about the first and second pulleys;

means for selectively actuating the second cable to vary the distance between the array of conveyor support frames and the first cable;

an endless conveyor belt supported on the array of conveyor support frames for movement around a course extending from the receiving zone over the open area to the discharge zone;

drive means for driving the conveyor belt around the course; and means for urging the endmost support rollers apart comprising means attached to the first cable for applying an axially outwardly directed force to the one end of the means for mounting the endmost roller for relative movement when the endless conveyor belt is loaded.

8. The aerial conveyor of claim 7 wherein the means for urging the endmost support rollers apart further comprises:

a first vehicle coupled to said one end of the elongate members;

a second vehicle positioned at the opposite end of the elongate members;

a winch supported from the second vehicle;

a tensioning line extending from the winch to the end of the elongate member opposite the first vehicle; and actuation means associated with the winch for drawing in the tensioning line to tension the conveyor belt.

9. The aerial conveyor system according to claim 7 wherein the means for urging the endmost support rollers apart further comprises: first and second vehicles connected to and supporting the opposite ends of the first cable, whereby both the receiving zone end and the discharge zone end of the conveyor system are independently positionable.

10. The aerial conveyor system according to claim 9 wherein the second vehicle includes:

a first discharge conveyor having first and second ends with the first end attached for movement with the discharge zone end of the conveyor belt for receiving thereon material discharged from the belt; and a second discharge conveyor having first and second ends with the second end attached for movement with the second vehicle and the first end slidably engaged with the first discharge conveyor for receiving material discharged from the second end of the first discharge conveyor while being axially slidably relative to the first discharge conveyor to permit movement of the second vehicle relative to the discharge zone end of the conveyor belt without disrupting the flow of material from the conveyor belt to the second discharge conveyor.

11. The aerial conveyor system of claim 10 further comprising:

a stinger conveyor rotatably mounted adjacent the second end of the second discharge conveyor for receiving material discharged from the second discharged conveyor; and means for rotating the stinger conveyor to selectively discharge material relative to the first vehicle.

12. The aerial conveyor system of claim 7 further characterized by:

a drive roller driven by the drive means and mounted on the discharge zone end of the conveyor support frame and defining the discharge zone end of the course of the conveyor;

the means for mounting the one endmost support roller for movement including a frame member suspended from the cable at the discharge zone end of the array of conveyor support frames for supporting the drive roller and the drive motor and secured against movement relative to the first cable and means supporting the frame member for axial movement relative to the conveyor support frame whereby the length of the course of the conveyor is variable.

13. An aerial conveyor system, comprising:

at least one first cable extending across a material receiving zone, across an open area comprising a substantial portion of the length of the first cable, and across a material discharge zone;

a first vehicle supporting the receiving zone end of the first cable and including material delivery means;

a second vehicle supporting the discharge zone end of the first cable;

said first and second vehicles being operable to tension said first cable;

a plurality of conveyor support frames each comprising parallel elongate members extending substantially beneath the first cable and a plurality of substantially transversely disposed conveyor support rollers each rotatably supported on the elongate members, said conveyor support frames engaging one another end-to-end to define an array extending between the receiving and discharge zones;

means for adjustably supporting the conveyor support frames from the first cable such that the conveyor support rollers may be raised and lowered relative to the cable;

an endless conveyor belt mounted for movement around a course defined by the conveyor support rollers of the conveyor support frames;

means for applying axially outwardly directed forces to the array of said conveyor support frames to establish a predetermined tension in the conveyor belt; and means for driving the conveyor belt around the course and thereby transporting material from the receiving zone across the open area to the discharge zone.

14. The aerial conveyor system of claim 13 wherein the means for adjustably supporting the conveyor support frames from the first cable comprises:

support cables connected between the elongate members and the first cable for supporting the elongate members from the first cable, the support cables being adjustable such that drawing in the support cables raises the elongate members relative to the first cable.

15. The aerial conveyor system of claim 14 further comprising:

a plurality of spaced first pulleys connected to the first cable; and a plurality of spaced second pulleys connected to the elongate members with the support cables threaded alternately between the first and second pulleys such that the elongate members are suspended from the first cable.

16. The aerial conveyor system according to claim 13 wherein the conveyor driving means is further characterized by a drive roller mounted at the discharge zone end of the conveyor support frame and defining the discharge zone end of the course of the conveyor and a drive motor for actuating the drive roller to move the endless conveyor belt around the course.

17. The aerial conveyor system according to claim 16 further comprising:

a frame member suspended from the cable at the discharge zone end of the conveyor support frame for supporting the drive roller and the drive motor secured against movement relative to the first cable;

means supporting the frame member for axial movement relative to the conveyor support frame whereby the length of the course of the conveyor is variable;

a roller mounted at the receiving zone end of the conveyor support frame for defining the receiving zone end of the course of the endless conveyor belt; and a tensioning device supported on the first vehicle for varying the tension in the conveyor belt in accordance with the weight of the material being transported by the conveyor system.

18. The aerial conveyor system according to claim 13 wherein the first vehicle includes:

a first discharge conveyor having first and second ends with the first end attached for movement with the discharge zone end of the conveyor belt for receiving thereon material discharged from the belt;

a second discharge conveyor having first and second ends with the second end attached for movement with the first vehicle and the second end slidably engaged with the first discharge conveyor for receiving material discharged from the second end of the first discharge conveyor while being axially slidably relative to the first discharge conveyor to permit movement of the first vehicle relative to the discharge zone end of the conveyor belt without disrupting the flow of material from the conveyor belt to the second discharge conveyor.

19. The aerial conveyor system of claim 18 further comprising:

a stinger conveyor rotatably mounted adjacent the second end of the second discharge conveyor for receiving material discharged from the second discharge conveyor; and means for rotating the stinger conveyor to selectively discharge material relative to the first vehicle.

* * * * *

UNITED STATES PATENT AND TRADEMARK OFFICE
CERTIFICATE OF CORRECTION

PATENT NO. : 4,234,073

DATED : November 18, 1980

INVENTOR(S) : Charles R. Satterwhite

It is certified that error appears in the above-identified patent and that said Letters Patent are hereby corrected as shown below:

Col. 6, Line 62 "Ths", should be The
Col. 7, Line 63, "FIGS." should be "FIG".
Col. 8, Line 24, "Step" should be "Steps"
Col. 13, Line 34, "will" should be "mill"
Col. 13, Line 43, "or" should be "of"
Col. 14, Line 56, "44" should be "404"
Col. 16, Line 18, "alternatively" should be "alternately"
Col. 16, Lines 29-30, "alternatively" should be "alternately"
Col. 17, Line 67, "369a" should be "396a"
Col. 22, Line 16, insert ---that--- after "art"
Col. 23, Line 56, "an" should be "and"
Col. 24, Line 7, "or" should be "of"
Claim 6, Col. 29, line 15, "record" should be "second"

Signed and Sealed this

Twenty-fourth Day of March 1981

[SEAL]

Attest:

RENE D. TEGTMEYER

Attesting Officer   Acting Commissioner of Patents and Trademarks